(12) United States Patent
Xiao et al.

(10) Patent No.: US 11,528,169 B2
(45) Date of Patent: Dec. 13, 2022

(54) METHOD FOR ADJUSTING PHY IN FLEXE GROUP, RELATED DEVICE, AND STORAGE MEDIUM

(71) Applicant: HUAWEI TECHNOLOGIES CO., LTD., Guangdong (CN)

(72) Inventors: Shuai Xiao, Wuhan (CN); Qiwen Zhong, Shenzhen (CN); Desheng Sun, Shenzhen (CN); Qichang Chen, Shenzhen (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 0 days.

(21) Appl. No.: 17/131,260

(22) Filed: Dec. 22, 2020

(65) Prior Publication Data

US 2021/0111933 A1 Apr. 15, 2021

Related U.S. Application Data

(63) Continuation of application No. PCT/CN2019/092102, filed on Jun. 20, 2019.

(30) Foreign Application Priority Data

Jun. 26, 2018 (CN) .......................... 201810672219.4

(51) Int. Cl.
*H04J 3/06* (2006.01)
*H04L 7/00* (2006.01)
(Continued)

(52) U.S. Cl.
CPC ................ *H04L 25/49* (2013.01); *H04J 3/02* (2013.01); *H04J 3/0682* (2013.01); *H04L 7/0041* (2013.01)

(58) Field of Classification Search
None
See application file for complete search history.

(56) References Cited

U.S. PATENT DOCUMENTS 10,097,480 B2 * 10/2018 Gareau .................. H04J 3/065
10,505,655 B2 * 12/2019 Hussain ............ H04Q 11/0062
(Continued)

FOREIGN PATENT DOCUMENTS

| CN | 106612203 A | 5/2017 |
|----|-------------|--------|
| CN | 106612220 A | 5/2017 |
| WO | 2018076143 A1 | 5/2018 |

OTHER PUBLICATIONS

Q. Wang, RSVP-IE Signaling Extensions in support of Flexible Ethernet networks, draft-wang-ccamp-flexe-signaling-01. Mar. 21, 2016, 12 pages.
(Continued)

*Primary Examiner* — Alpus Hsu
(74) *Attorney, Agent, or Firm* — Womble Bond Dickinson (US) LLP

(57) ABSTRACT

A receiving device determines that a first PHY needs to be added to a first FlexE group in a working state. The receiving device performs a deskew on the first PHY or each PHY in the first FlexE group based on a received data stream corresponding to the first PHY and a received data stream corresponding to each PHY in the first FlexE group, and restores a data stream corresponding to a client from a PHY in the first FlexE group. If a skew between the data stream corresponding to the first PHY and the data stream corresponding to each PHY in the first FlexE group after the deskew is performed is zero, the receiving device restores a data stream corresponding to a client from a PHY in a second FlexE group so that flexibility of adjusting a PHY in a FlexE group in a working state is improved.

20 Claims, 8 Drawing Sheets

(51) Int. Cl.
    *H04L 25/49*     (2006.01)
    *H04J 3/02*     (2006.01)

(56) References Cited

U.S. PATENT DOCUMENTS

| | | | |
|---|---|---|---|
| 2017/0005742 A1* | 1/2017 | Gareau | H04L 25/49 |
| 2017/0005901 A1* | 1/2017 | Gareau | H04L 43/10 |
| 2017/0005949 A1 | 1/2017 | Gareau et al. | |
| 2017/0093757 A1* | 3/2017 | Gareau | H04L 43/0864 |
| 2018/0167160 A1 | 6/2018 | Gareau et al. | |
| 2019/0199505 A1* | 6/2019 | Zhang | H04L 7/0008 |
| 2021/0044510 A1* | 2/2021 | Deng | H04L 43/0894 |
| 2021/0091871 A1* | 3/2021 | Deng | H04L 12/2823 |

OTHER PUBLICATIONS

La# Oif: 11 Flex Ethernet 2.0, Implementation Agreement 11 , Flex Ethernet 2.0 Implementation,Agreement,Jun. 22, 2018, 51 pages.

\* cited by examiner

METHOD FOR ADJUSTING PHY IN FLEXE GROUP, RELATED DEVICE, AND STORAGE MEDIUM

CROSS-REFERENCE TO RELATED APPLICATIONS

This application is a continuation of International Application No. PCT/CN2019/092102, filed on Jun. 20, 2019, which claims priority to Chinese Patent Application No. 201810672219.4, filed on Jun. 26, 2018, The disclosures of the aforementioned applications are hereby incorporated by reference in their entireties.

TECHNICAL FIELD

The application relates to the communications field, and in particular, to a method for adjusting a PHY in a FlexE group, a related device, and a storage medium.

BACKGROUND

Related standards of the 802.3 standard Ethernet (StdE) defined by the Institute of Electrical and Electronics Engineers (IEEE) are widely applied in the industry. The standard Ethernet is greatly concerned by vendors due to advantages of a simple principle, easy implementation, and a low price. However, with development of technologies, a difference between bandwidth granularites becomes larger, and a deviation between an interface of the standard Ethernet and an actual application requirement also becomes larger. A case is most likely to occur: A bandwidth required by a mainstream application does not belong to any existing Ethernet standard rate. For example, resources are wasted if a 100 GE port is used to carry a 50 Gb/s service, and currently, there is no corresponding Ethernet standard granularity that can carry a 200 Gb/s service.

To meet this challenge, the Optical Interworking Forum (OIF) publishes the flexible Ethernet (FlexE), and the FlexE is a general-purpose technology that supports a plurality of media access control (Medium Access Control, MAC) layer rates. A plurality of 100 GE physical layer interfaces are bound, and each 100 GE port is divided into 20 slots by using 5 G as a granularity in time domain, so that the FlexE may support the following functions: binding, where a plurality of Ethernet interfaces are bound into one link group to support a medium access control (MAC) service whose rate is greater than that of a single Ethernet interface; a sub-rate that supports, by allocating a slot to a service, a MAC service whose rate is less than a link group bandwidth or is less than a signal Ethernet interface bandwidth; and channelization that supports, by allocating a slot to a service, simultaneous transmission of a plurality of MAC services in a link group, for example, supports simultaneous transmission of one 150 G MAC service and two 25 G MAC services in a 2×100 GE link group.

In the FlexE, slot division is performed in a time division multiplexing (TDM) mode, to implement hard isolation of transmission pipeline bandwidths. A service data stream may be allocated to one or more slots, to implement matching of various rate services. A FlexE group may include one or more physical link interfaces. A FlexE overhead (OH) block is periodically inserted into data on each PHY in the FlexE, to implement slot location positioning inside the PHY and alignment between different PHYs. Specifically, one 66 B OH block may be inserted at intervals of 1023×20 66 B payload data blocks. FIG. 1 is a schematic diagram of an example of a communications system based on a flexible Ethernet protocol. As shown in FIG. 1, for example, a FlexE group includes four PHYs. A flexible Ethernet protocol client (FlexE Client) represents a client data stream transmitted in a specified slot (e.g., one or more slots) in the FlexE group, and a plurality of FlexE clients may be carried in one FlexE group. One FlexE client is corresponding to one user service data stream (typically, the one FlexE client may be referred to as a medium access control (MAC) client. A flexible Ethernet protocol functional layer (which may be referred to as FlexE Shim) provides data adaption and conversion from the FlexE client to the MAC client.

In the prior art, a PHY included in a FlexE group needs to be predefined. If a PHY needs to be added to a working FlexE group, the FlexE group needs to stop working, then the PHY in the FlexE group is redefined, and the FlexE is restarted to work after the definition is completed.

In conclusion, a solution to adjusting a PHY in a FlexE group is urgently needed, to flexibly adjust a PHY in a FlexE group in a working state.

SUMMARY

The application provides a solution to adjusting a PHY in a FlexE group, to flexibly adjust a PHY in a FlexE group in a working state.

In an embodiment, the application provides a method for adjusting a PHY in a FlexE group. The method includes: determining, by a receiving device, that a first physical port PHY needs to be added to a first FlexE group in a working state; performing, by the receiving device, deskew on the first PHY or each PHY in the first FlexE group based on a received data stream corresponding to the first PHY and a received data stream corresponding to each PHY in the first FlexE group, and restoring a data stream corresponding to a client from a PHY in the first FlexE group; and if skew between the data stream corresponding to the first PHY and the data stream corresponding to each PHY in the first FlexE group after the deskew is performed is zero, restoring, by the receiving device, a data stream corresponding to a client from a PHY in a second FlexE group, where the second FlexE group is a FlexE group after the first PHY is added to the first FlexE group. In this way, the first PHY may be added to the first FlexE group in the working state, and a normal working state of another PHY in the first FlexE group is maintained. Compared with a prior-art solution in which the FlexE group needs to be first stopped working and then a PHY in the FlexE group is redefined, the solution provided in the application can improve flexibility of adjusting a PHY in a FlexE group in a working state.

In an embodiment, for any two data streams that are respectively of the data stream corresponding to each PHY in the first FlexE group and the data stream corresponding to the first PHY, locations of two associated overhead OH blocks respectively inserted by a sending device in the two data streams are the same. In this way, the side of a receiving device performs alignment processing on the two data streams based on the OH blocks.

To improve flexibility of the solution, in an embodiment, the performing, by the receiving device, deskew on the first PHY or each PHY in the first FlexE group based on a received data stream corresponding to the first PHY and a received data stream corresponding to each PHY in the first FlexE group, and restoring a data stream corresponding to a client from a PHY in the first FlexE group includes: adding, by the receiving device, the first PHY to the first FlexE group; and performing, by the receiving device, deskew on the first PHY or each PHY in the second FlexE group other than the first PHY based on a data stream corresponding to each PHY in the second FlexE group, and restoring a data stream corresponding to a client from a PHY in the second FlexE group other than the first PHY.

In another embodiment, the performing, by the receiving device, deskew on the first PHY or each PHY in the first FlexE group based on a received data stream corresponding to the first PHY and a received data stream corresponding to each PHY in the first FlexE group, and restoring a data stream corresponding to a client from a PHY in the first FlexE group includes: performing, by the receiving device, deskew on the first PHY or each PHY in the first FlexE group based on the received data stream corresponding to the first PHY and the received data stream corresponding to each PHY in the first FlexE group, and restoring the data stream corresponding to the client from the PHY in the first FlexE group; and after the skew between the data stream corresponding to the first PHY and the data stream corresponding to each PHY in the first FlexE group after the deskew is performed by the receiving device is zero, and before the restoring a data stream corresponding to a client from a PHY in the second FlexE group, the method further includes: adding, by the receiving device, the first PHY to the first FlexE group.

In an optional implementation, after the determining, by a receiving device, that a first PHY needs to be added to a first FlexE group in a working state, and before the skew between the data stream corresponding to the first PHY and the data stream corresponding to each PHY in the first FlexE group after the deskew is performed by the receiving device is zero, the method further includes: sending, by the receiving device, first indication information to the sending device, where the first indication information is used to indicate that skew between the data stream corresponding to the first PHY and a data stream corresponding to any PHY in the first FlexE group is not adjusted to zero and/or that the first PHY is not added to the first FlexE group by the receiving device. In this way, the sending device can know that the first PHY does not have a capability of receiving the data stream corresponding to the client carried in the second FlexE group on the side of the receiving device. After the skew between the data stream corresponding to the first PHY and the data stream corresponding to each PHY in the first FlexE group after the deskew is performed by the receiving device is zero, and after the adding the first PHY to the first FlexE group, the method further includes: sending, by the receiving device, second indication information to the sending device, where the second indication information is used to indicate that skew between the data stream corresponding to the first PHY and a data stream corresponding to any PHY in the first FlexE group is adjusted to zero and that the first PHY is added to the first FlexE group by the receiving device. In this way, the sending device can know that the first PHY has a capability of receiving the data stream corresponding to the client carried in the second FlexE group on the side of the receiving device.

In an optional implementation, the performing, by the receiving device, deskew on the first PHY or each PHY in the first FlexE group includes: performing, by the receiving device, deskew on the first PHY by adjusting a fill level of the first PHY in a preset buffer; or performing, by the receiving device, deskew on each PHY in the first FlexE group by adjusting a fill level of each PHY in the first FlexE group in a preset buffer.

To further optimize the solution of The application, in an optional implementation, after the determining, by a receiving device, that a first PHY needs to be added to a first FlexE group in a working state, and before the performing, by the receiving device, deskew on the first PHY, the method further includes: determining, by the receiving device, that a capacity of the preset buffer is not less than a buffer capacity required for performing deskew on the first PHY. In another optional implementation, after the determining, by a receiving device, that a first PHY needs to be added to a first FlexE group in a working state, and before the performing, by the receiving device, deskew on each PHY in the first FlexE group, the method further includes: determining, by the receiving device, that a capacity of the preset buffer is not less than a buffer capacity required for performing deskew on each PHY in the first FlexE group.

In an optional implementation, after the determining, by a receiving device, that a first PHY needs to be added to a first FlexE group in a working state, the method further includes: giving, by the receiving device, an alarm if determining that the capacity of the preset buffer is less than the buffer capacity required for performing deskew on the first PHY and each PHY in the first FlexE group. In this way, a related person can be notified of a problem occurring in a PHY adjustment process timely, so that the related person performs accurate processing timely.

In an optional implementation, the method further includes: determining, by the receiving device, that a second PHY needs to be deleted from the first FlexE group in a working state, where the second PHY is any PHY in the first FlexE group; and performing, by the receiving device, any one of the following content: restoring, by the receiving device, a data stream corresponding to a client from a data stream corresponding to a PHY in the first FlexE group other than the second PHY; deleting the second PHY from the first FlexE group after the restoring, by the receiving device, a data stream corresponding to a client from a data stream corresponding to a PHY in the first FlexE group other than the second PHY; and deleting, by the receiving device, the second PHY from the first FlexE group, and restoring a data stream corresponding to a client from a data stream corresponding to a PHY in a third FlexE group, where the third FlexE group is a FlexE group after the second PHY is deleted from the first FlexE group. In this way, the PHY may be flexibly deleted from the FlexE group in the working state, and normal working of another PHY is not affected.

In an optional implementation, the method further includes: determining, by the receiving device, that the second PHY in the first FlexE group is faulty, where the second PHY is any PHY in the first FlexE group; and performing, by the receiving device, any one of the following content: restoring, by the receiving device, the data stream corresponding to the client from the data stream corresponding to the PHY in the first FlexE group other than the second PHY, and generating a local fault block stream corresponding to the second PHY; deleting the second PHY from the first FlexE group after the restoring, by the receiving device, the data stream corresponding to the client from the data stream corresponding to the PHY in the first FlexE group other than the second PHY, and after the generating a local fault block stream corresponding to the second PHY; and deleting, by the receiving device, the second PHY from the first FlexE group, and restoring the data stream corresponding to the client from the data stream corresponding to the PHY in the third FlexE group, where the third FlexE group is the FlexE group after the second PHY is deleted from the first FlexE group. In this way, when the second PHY is faulty, the second PHY may be flexibly deleted from the FlexE group in the working state, and normal working of another PHY in the FlexE group is not affected.

In an optional implementation, the method further includes: if the receiving device determines that the second PHY needs to be deleted from the first FlexE group in the working state or that the second PHY is faulty, decreasing, by the receiving device, the deskew on the PHY in the first FlexE group other than the second PHY. In this way, deskew on another PHY may be further optimized, thereby increasing a data transmission rate.

In an embodiment, the application provides a method for adjusting a PHY in a FlexE group. The method includes: determining, by a sending device, that a first physical port PHY needs to be added to a first FlexE group in a working state; adding, by the sending device, the first PHY to the first FlexE group; and sending, by the sending device, a preset data stream through the first PHY in a second FlexE group, and sending a data stream corresponding to a client through a PHY in the second FlexE group other than the first PHY, where the second FlexE group is a FlexE group after the first PHY is added to the first FlexE group. Because the first PHY is added to the second FlexE group, locations of two associated overhead OH frames respectively inserted by the sending device in any two data streams in the second FlexE group on the side of a sending device are the same. In this way, a foundation is laid for performing, by the side of a receiving device, deskew on the first PHY or each PHY in the first FlexE group based on a received data stream corresponding to the first PHY and a received data stream corresponding to each PHY in the first FlexE group, thereby improving flexibility of adjusting a PHY in a FlexE group in a working state.

In an optional implementation, the method further includes: receiving, by the sending device, first indication information, where the first indication information is used to indicate that skew between a data stream corresponding to the first PHY and a data stream corresponding to any PHY in the first FlexE group is not adjusted to zero and/or that the first PHY is not added to the first FlexE group by a receiving device; and receiving, by the sending device, second indication information, and when the second indication information is received, determining that the first PHY has a capability of sending a data stream corresponding to a client carried in the second FlexE group.

In an optional implementation, the method further includes: if the sending device determines that a second PHY needs to be deleted from the first FlexE group in the working state or that a second PHY in the first FlexE group is faulty, and the second PHY is any PHY in the first FlexE group, sending, by the sending device through a PHY in the first FlexE group other than the second PHY, a data stream of a client corresponding to the first FlexE group, and stopping sending, through the second PHY, the data stream of the client corresponding to the first FlexE group. In another optional implementation, the method further includes: if the sending device determines that a second PHY needs to be deleted from the first FlexE group in the working state or that a second PHY in the first FlexE group is faulty, sending, by the sending device through a PHY in the first FlexE group other than the second PHY, a data stream of a client corresponding to the first FlexE group, stopping sending, through the second PHY, the data stream of the client corresponding to the first FlexE group, and deleting the second PHY from the first FlexE group. In this way, when the second PHY is faulty, the second PHY may be flexibly deleted from the FlexE group in the working state, and normal working of another PHY in the FlexE group is not affected.

In an embodiment, the application provides a method for adjusting a PHY in a FlexE group. The method includes: determining, by a sending device, that a first physical port PHY needs to be added to a first FlexE group in a working state; sending, by the sending device, a preset data stream through the first PHY, and sending a data stream corresponding to a client through a PHY in the first FlexE group. For any two data streams that are respectively of a data stream corresponding to each PHY in the first FlexE group and a data stream corresponding to the first PHY, locations of two associated overhead OH frames respectively inserted by the sending device in the two data streams are the same. In this way, a foundation is laid for performing, by the side of a receiving device, deskew on the first PHY or each PHY in the first FlexE group based on a received data stream corresponding to the first PHY and a received data stream corresponding to each PHY in the first FlexE group, thereby improving flexibility of adjusting a PHY in a FlexE group in a working state.

In an optional implementation, the method further includes: receiving, by the sending device, first indication information, where the first indication information is used to indicate that skew between a data stream corresponding to the first PHY and a data stream corresponding to any PHY in the first FlexE group is not adjusted to zero and/or that the first PHY is not added to the first FlexE group by a receiving device; and receiving, by the sending device, second indication information, and when the second indication information is received, determining that the first PHY has a capability of sending a data stream corresponding to a client carried in the second FlexE group, where the second indication information is used to indicate that skew between the data stream corresponding to the first PHY and a data stream corresponding to any PHY in the first FlexE group is adjusted to zero and that the first PHY is added to the first FlexE group by the receiving device.

In an optional implementation, after the receiving, by the sending device, second indication information, the method further includes: adding, by the sending device, the first PHY to the first FlexE group.

In an optional implementation, the method further includes: if a second PHY needs to be deleted from the first FlexE group in the working state or a second PHY in the first FlexE group is faulty, and the second PHY is any PHY in the first FlexE group, sending, by the sending device through a PHY in the first FlexE group other than the second PHY, a data stream of a client corresponding to the first FlexE group, and stopping sending, through the second PHY, the data stream of the client corresponding to the first FlexE group. In another optional implementation, the method further includes: if a second PHY needs to be deleted from the first FlexE group in the working state or a second PHY in the first FlexE group is faulty, and the second PHY is any PHY in the first FlexE group, sending, by the sending device through a PHY in the first FlexE group other than the second PHY, a data stream of a client corresponding to the first FlexE group, stopping sending, through the second PHY, the data stream of the client corresponding to the first FlexE group, and deleting the second PHY from the first FlexE group. In this way, when the second PHY is faulty, the second PHY may be flexibly deleted from the FlexE group in the working state, and normal working of another PHY in the FlexE group is not affected.

An embodiment of the application provides a network device. The network device includes a memory, a transceiver, and a processor, where the memory is configured to store an instruction; the processor is configured to execute the instruction stored in the memory, and control the transceiver to receive and send a signal; and when the processor executes the instruction stored in the memory, the network device is configured to perform methods as described herein.

An embodiment of the application provides a network device. The network device includes corresponding function modules respectively configured to implement operations in the foregoing methods. A function may be implemented by hardware, or may be implemented by corresponding software executed by hardware. The hardware or software includes one or more modules corresponding to the foregoing functions.

In a possible design, a structure of the network device includes a processing unit and a transceiver unit. The units may execute corresponding functions in the methods as described herein. For details, refer to the detailed descriptions in the method example. Details are not described herein again.

An embodiment of the application provides a computer storage medium, where the computer storage medium stores an instruction, and when the instruction is run on a computer, the computer is enabled to perform methods as described herein.

An embodiment of the application provides a computer program product including an instruction, where when the computer program product is run on a computer, the computer is enabled to perform methods as described herein.

DESCRIPTION OF EMBODIMENTS

Solutions provided in the embodiments of the application support implementation of a network device with a FlexE interface. Product forms of the network device include a core router, an internet protocol radio access network (IP-RAN), and a packet transport network (PTN) box-type or frame-type device that support the FlexE interface. The following first describes an example of a principle of data transmission in an existing FlexE group with reference to FIG. 2 and FIG. 3.

Figure 1:
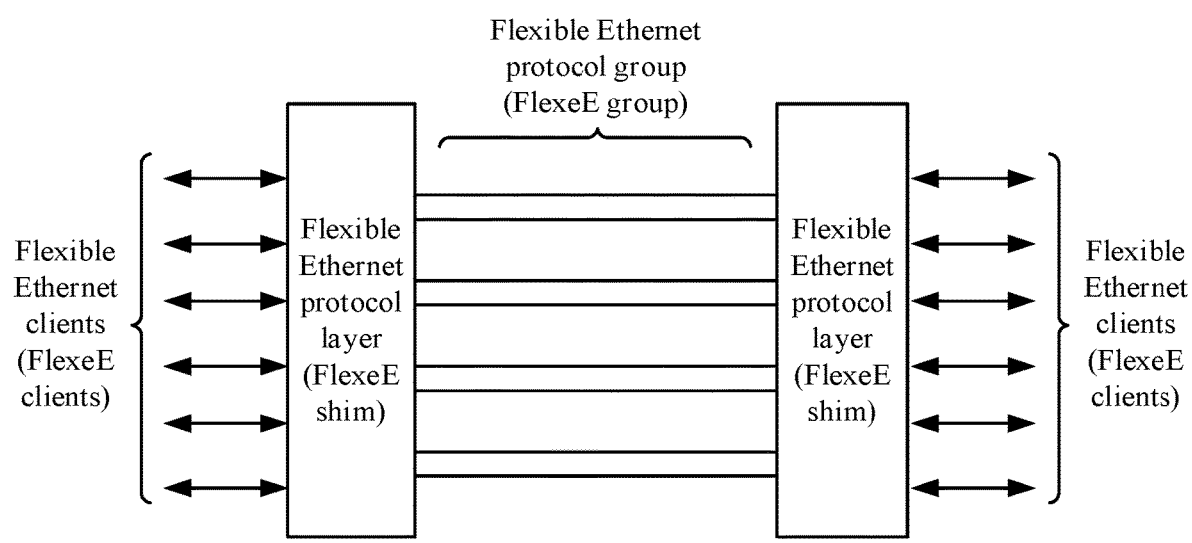
FIG. 1 is a schematic diagram of a communications system based on a flexible Ethernet protocol in the prior art.
Figure 2:
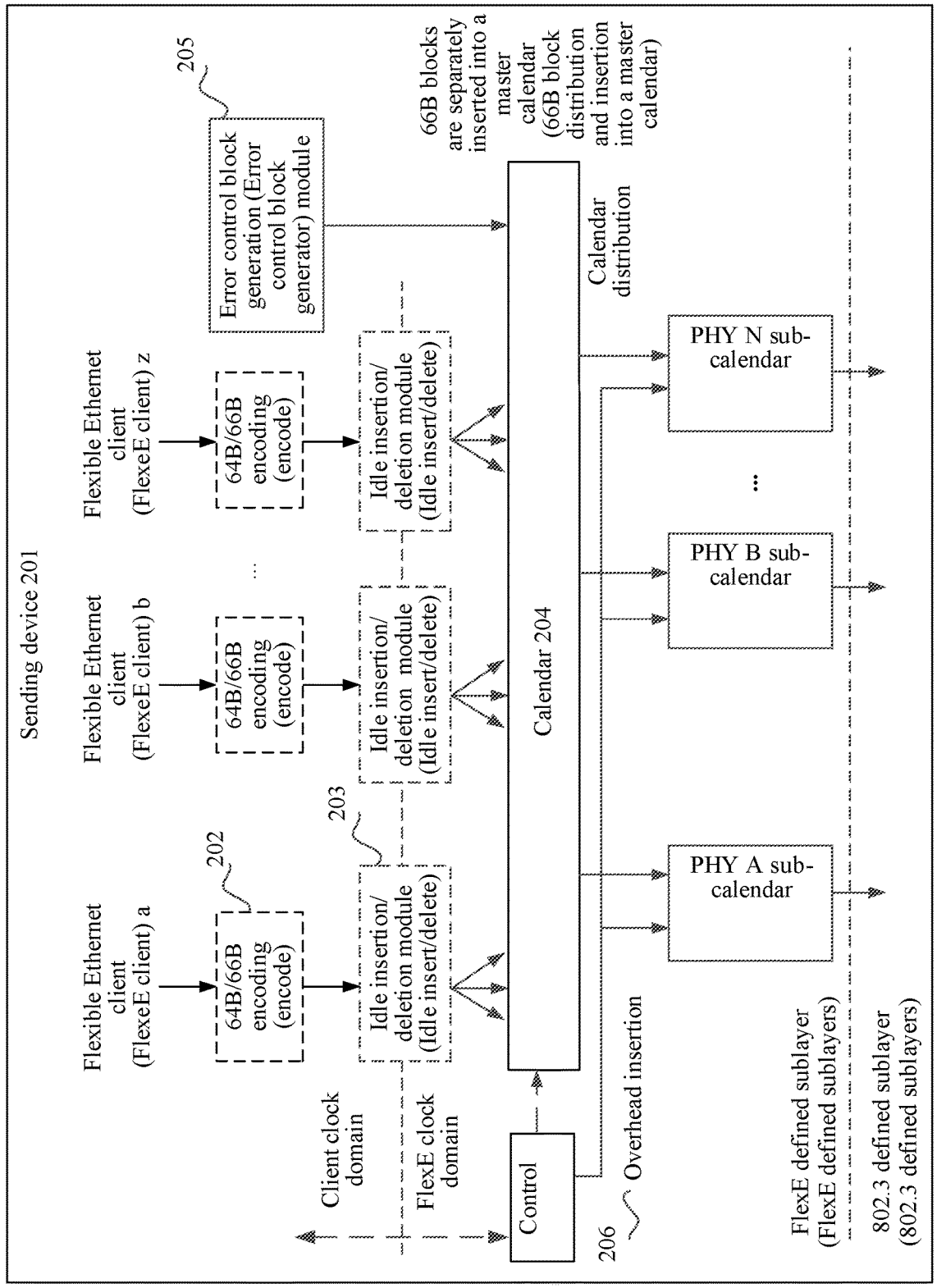
FIG. 2 is a schematic diagram of a data sending procedure that is on the side of a sending device according to an embodiment of the application.

FIG. 2 is a schematic diagram of an example of a data sending procedure that is on the side of a sending device according to an embodiment of the application. As shown in FIG. 2, a FlexE group on the side of a sending device 201 may include zero, one, or more FlexE clients, such as a FlexE client a, a FlexE client b, . . . , and a FlexE client z shown in FIG. 2. Data corresponding to each FlexE client is encoded (encode) and sent to a FlexE shim. For example, 64B/66B encoding 202 is performed on data corresponding to the FlexE client a. FIG. 2 schematically shows an example in which an encoding scheme is 64B/66B encoding. One of ordinary skill in the art may learn that another encoding form is also applicable.

In the FlexE, a clock frequency deviation may exist between a client clock domain and a FlexE clock domain. Inserting an overhead (OH) block and an alignment block (e.g., Alignment marker, AM) on a FlexE interface needs specific bandwidth overheads, and the AM is a block used to perform an alignment operation. Therefore, an idle block insertion/deletion (e.g., IDLE insert/delete) module may be used to achieve rate adaptation between the FlexE client and the FlexE group. For example, for an encoded block stream of the FlexE client a, an idle block insertion/deletion module 203 may be used to implement the rate adaptation between the FlexE client a and the FlexE group. Optionally, another block may alternatively be used to implement the rate adaptation. For example, an ordered set block is deleted to achieve the rate adaptation between the FlexE client and the FlexE group. In FIG. 2, only an example in which an idle block is inserted/deleted is used for description.

Further, a calendar 204 module may be used to allocate, to a slot corresponding to each FlexE client, a block stream that is after the idle block is inserted/deleted and that is corresponding to each FlexE client.

The side of the sending device 201 further includes an error control block generation (Error Control Block Generator) 205 module, configured to generate an error block stream. In some proper scenarios, the generated error block stream may be sent to the side of a receiving device.

According to a predefined frame format, an operation of OH insertion 206 is performed on a block stream in 20 slots corresponding to each PHY in the calendar 204. In addition, based on a correspondence between the slot and each PHY, the block stream inserted with an overhead is allocated to each PHY for transmission. A sub-calendar of each PHY may represent an allocation relationship of the 20 slots of each PHY. FIG. 2 schematically shows a PHY A sub-calendar, a PHY B sub-calendar, . . . , and a PHY N sub-calendar. A process of mapping each block stream to each PHY is from a FlexE defined sublayer to a physical layer interface, for example, an 802.3 defined sublayer shown in FIG. 2. The 802.3 defined sublayer may alternatively be understood as partial content of an 802.3 defined standard physical layer. Optionally, there are a plurality of modules in the 802.3 defined sublayer such as a scrambling (Scramble) module, and the scrambling module has a scrambling function according to a definition in the 802.3 standard. Optionally, in the 802.3 defined sublayer, modules such as lane distribution, alignment block insertion (AM insertion), a physical medium attachment (PMA) layer, a physical medium dependent (PMD) layer, and the like may be further included, to perform corresponding processing on received data.

Figure 3:
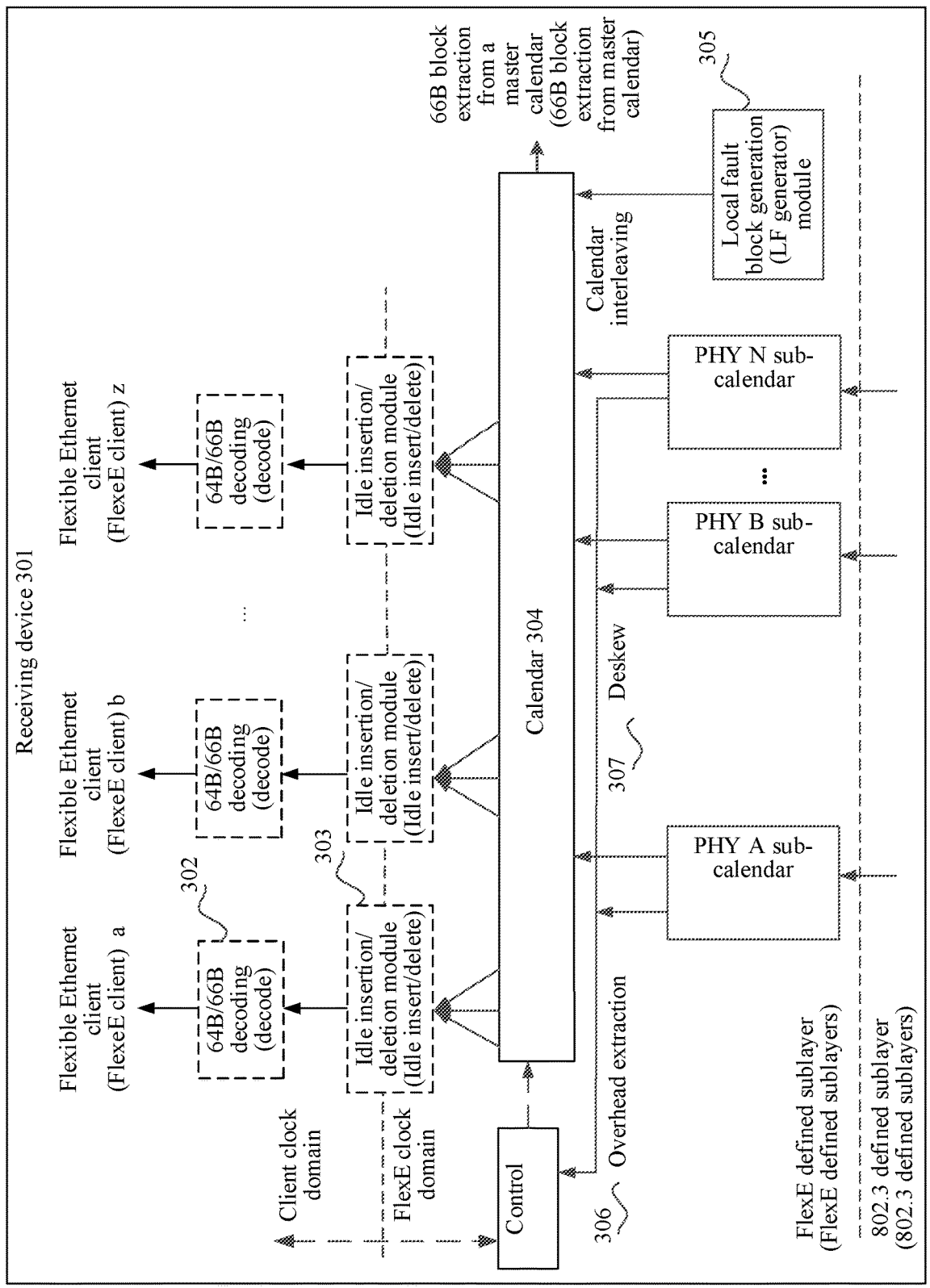
FIG. 3 is a schematic diagram of a data receiving procedure that is on the side of a receiving device according to an embodiment of the application is applied.

FIG. 3 is a schematic diagram of an example of a data receiving procedure that is on the side of a receiving device according to an embodiment of the application is applied. As shown in FIG. 3, data on the side of a sending device is transmitted to the side of the receiving device through a standard physical interface, and at an 802.3 defined sublayer on the side of a receiving device 301, a series of processing is performed on the data transmitted through each PHY, for example, processing at a physical medium dependent (PMD) layer, processing at a physical medium attachment (PMA) layer, processing at a physical coding sublayer (PCS), performing lane deskew, alignment block removal (AM removal), and descrambling (Descramble).

Further, overhead locking is performed after a data stream corresponding to each PHY is descrambled, and an operation of overhead extraction 306 is performed after overhead locking is performed. There are not exactly the same path delays when the data is transmitted through each PHY. An operation of deskew 307 may be performed on a data stream that is on each PHY and on which the operation of overhead extraction 306 is performed, and the data stream that is on each PHY and on which the operation of deskew 307 is performed is sent to a calendar 304 module based on a correspondence between each PHY and a slot. The calendar 304 may restore, based on an allocation relationship between each FlexE client and the slot, a block stream corresponding to each FlexE client. A sub-calendar of each PHY may represent an allocation relationship of 20 slots of each PHY. FIG. 3 schematically shows a PHY A sub-calendar, a PHY B sub-calendar, . . . , and a PHY N sub-calendar.

Further, in the FlexE, a clock frequency deviation may exist between a client clock domain and a FlexE clock domain. Inserting an OH and an AM on a FlexE interface needs specific bandwidth overheads. Therefore, an idle block insertion/deletion (IDLE insert/delete) module may be used to achieve rate adaptation between the FlexE client and the FlexE group. For example, for a block stream that is corresponding to a FlexE client a and that is restored by the calendar 304, an idle block insertion/deletion module 303 is used to implement the rate adaptation between the FlexE client a and the FlexE group. Optionally, another block may alternatively be used to implement the rate adaptation. For example, an ordered set block is deleted to achieve the rate adaptation between the FlexE client and the FlexE group. In FIG. 3, only an example in which an idle block is inserted/deleted is used for description.

Processing of inserting/deleting idle block and processing of encoding may be sequentially performed on a block stream that is corresponding to each FlexE client and that is restored by the calendar 304, and the processed block stream is sent to each corresponding FlexE client. For example, the block stream that is corresponding to the FlexE client a and that is restored by the calendar 304 may be sequentially processed by the idle block insertion/deletion module 303 and a 64B/66B decoding (decode) 302 module. FIG. 3 schematically shows an example in which a decoding scheme is 64B/66B encoding. One of ordinary skill in the art may learn that another encoding form is also applicable.

In an embodiment of the application, the sending device and the receiving device may be disposed on one physical entity, or may be separately disposed on two physical entities. This is not limited in an embodiment of the application.

In an embodiment of the application, a data stream corresponding to a client may be a service data stream corresponding to the client. A data stream corresponding to one client may be, for example, a data stream sent by the FlexE client a in FIG. 2, or may be, for example, a data stream to be received by the FlexE client a in FIG. 3.

In an embodiment of the application, a data stream corresponding to a PHY may be a transmitted data stream corresponding to one PHY in the FlexE, and the data stream corresponding to one PHY may be, for example, a data stream that needs to be transmitted through the PHY A in FIG. 2. The data stream corresponding to one PHY may include data in a data stream corresponding to one or more clients. A quantity of data streams that are corresponding to clients and that may be included in data streams corresponding to one PHY depends on a correspondence among a slot, a FlexE client, and a PHY. This is not limited in an embodiment of the application.

Figure 4:
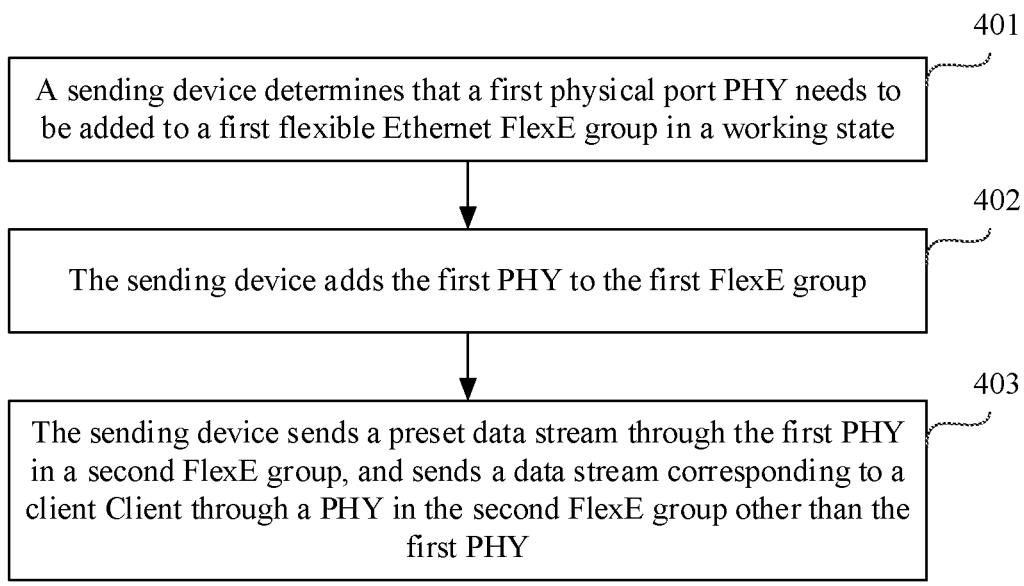
FIG. 4 is a schematic flowchart of a method for adjusting a PHY in a FlexE group performed by the side of a sending device according to an embodiment of the application.

Based on the foregoing content, FIG. 4 is a schematic flowchart of an example of a method for adjusting a PHY in a FlexE group performed by the side of a sending device according to an embodiment of the application. The method includes the following operations.

Operation 401: The sending device determines that a first PHY needs to be added to a first FlexE group in a working state. In an embodiment, the sending device may receive an instruction sent by another device, and the instruction is used to indicate that the first PHY needs to be added to the first FlexE group in the working state. Alternatively, the sending device determines, according to a preset rule, that the first PHY needs to be added to the first FlexE group in the working state. For example, the first physical port PHY needs to be added to the first FlexE group in the working state when load reaches a first threshold or a first preset moment is reached. Alternatively, when the first PHY is faulty, the side of the sending device removes the first PHY from the FlexE group, and when the first PHY is repaired, the side of the sending device determines that a PHY needs to be added to the first FlexE group in the working state.

In operation 401, one FlexE group may include zero, one, or more clients. The first FlexE group in the working state is specifically that a data stream corresponding to a client is being transmitted through a PHY in the FlexE group. Data streams corresponding to some clients in the FlexE group may be transmitted, or data streams corresponding to all clients in the FlexE group may be transmitted. This is not limited in an embodiment of the application.

Operation 402: The sending device adds the first PHY to the first FlexE group. Both the side of the sending device and a side of a receiving device are configured with information about a PHY included in the FlexE group. In an embodiment of the application, an action of adding the first PHY to the first FlexE group may be specifically adding configuration information of the first PHY into the first FlexE group, for example, writing an identifier of the first PHY into the first FlexE group and writing an identifier of a FlexE group of the first PHY as an identifier of the first FlexE group.

Operation 403: The sending device sends a preset data stream through the first PHY in a second FlexE group, and sends a data stream corresponding to a client through a PHY in the second FlexE group other than the first PHY, where the second FlexE group is a FlexE group after the first PHY is added to the first FlexE group. Optionally, the preset data stream may be an error block stream, for example, may be an error block stream generated by the error control block generation 205 module in FIG. 2, or may be an idle block stream, or may be some predefined block streams, or the like.

In operation 403, because the sending device adds the first PHY to the first FlexE group in operation 402, when the sending device inserts an overhead, the second FlexE group may meet a condition: Locations of two associated overhead OH blocks respectively inserted by the sending device in any two data streams in one FlexE group are the same. The condition has been defined in the prior art, and the condition may be described as "the FlexE overhead as described in clause 7.3 is inserted onto each FlexE group PHY after every 1023 repetitions of the sub-calendar sequence in the same relative position to the calendar sequence on every PHY" in an existing standard. In this way, the side of the receiving device may perform deskew based on a received data stream on each PHY in the second FlexE group.

Figure 5:
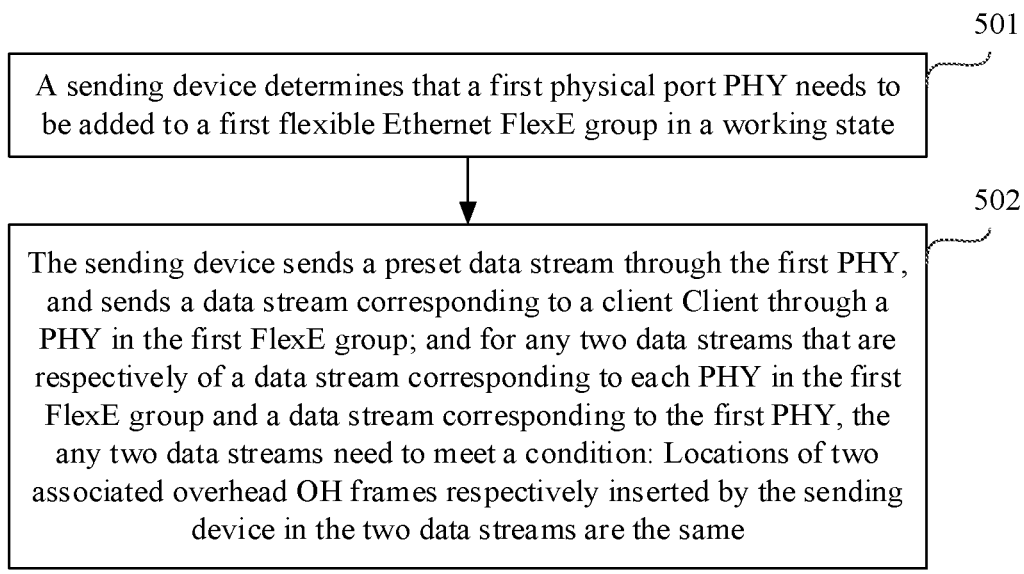
FIG. 5 is a schematic flowchart of another method for adjusting a PHY in a FlexE group performed by the side of a sending device according to an embodiment of the application.

Based on the foregoing content, FIG. 5 is a schematic flowchart of an example of another method for adjusting a PHY in a FlexE group performed on the side of a sending device according to an embodiment of the application. Compared with the solution in FIG. 4 in which the sending device first adds the first PHY to the first FlexE group in operation 402 and then sends the data stream by using the second FlexE group, in the method shown in FIG. 5, the first PHY may not be first added to the first FlexE group, but the data streams are directly sent through the first PHY and by using the first FlexE group respectively. The method includes the following operations.

Operation 501: The sending device determines that a first PHY needs to be added to a first FlexE group in a working state. Related descriptions of this operation are the same as content in the foregoing operation 401. Details are not described herein again.

Operation 502: The sending device sends a preset data stream through the first PHY, and sends a data stream corresponding to a client through a PHY in the first FlexE group.

In operation 502, to enable the side of a receiving device to perform deskew based on a received data stream on each PHY in the second FlexE group, for any two data streams that are respectively of a data stream corresponding to each PHY in the first FlexE group and a data stream corresponding to the first PHY, the any two data streams need to meet a condition: Locations of two associated overhead OH frames respectively inserted by the sending device in the two data streams are the same. The condition may be described as "the FlexE overhead is inserted onto each PHY after every 1023 repetitions of the sub-calendar sequence in the same relative position to the calendar sequence on every PHY" in English. In this way, the side of the receiving device may perform deskew based on the received data stream on each PHY in the second FlexE group.

Further, after operation 502, the sending device may add the first PHY to the first FlexE group. Alternatively, after determining that the side of the receiving device adds the first PHY to the first FlexE and performing deskew on the first PHY and each PHY in the first FlexE group, the sending device adds the first PHY to the first FlexE group. More specifically, there are a plurality of implementations, and several implementations are described in subsequent content.

Figure 6:
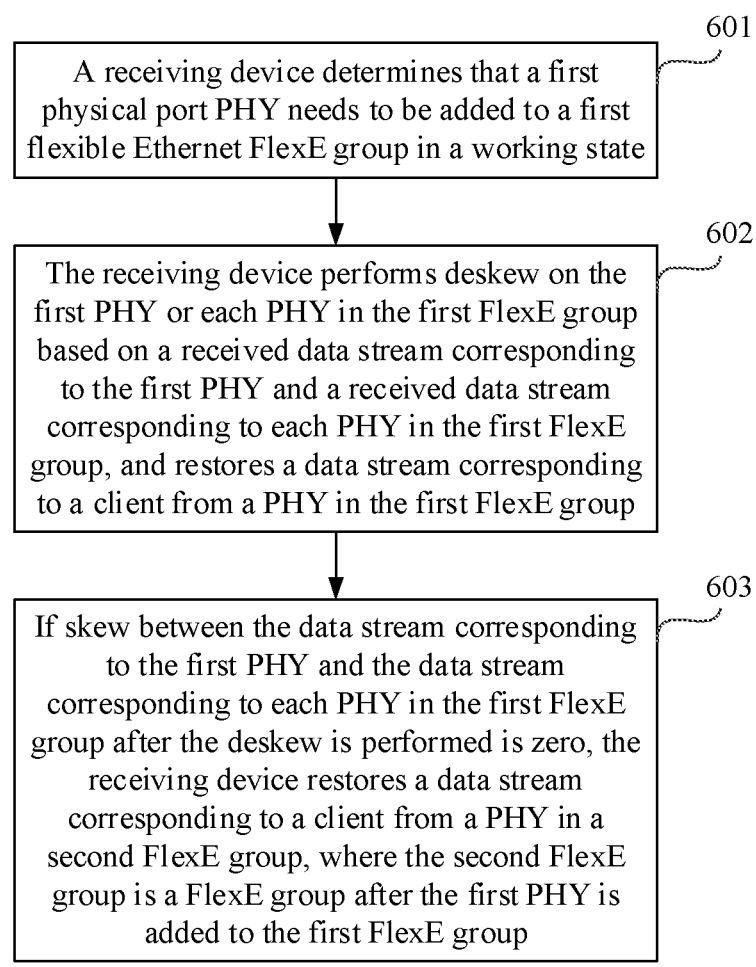
FIG. 6 is a schematic flowchart of a method for adjusting a PHY in a FlexE group performed by the side of a receiving device according to an embodiment of the application.

Two solutions on the side of the sending device are respectively described in FIG. 4 and FIG. 5. Based on the two solutions, FIG. 6 is a schematic flowchart of an example of a method for adjusting a PHY in a FlexE group performed by the side of a receiving device according to an embodiment of the application. The method includes the following operations.

Operation 601: The receiving device determines that a first PHY needs to be added to a first FlexE group in a working state. In an embodiment, the receiving device may receive an instruction sent by another device, and the instruction is used to indicate that the first physical port PHY needs to be added to the first FlexE group in the working state. Alternatively, the receiving device determines, according to a preset rule, that the first physical port PHY needs to be added to the first FlexE group in the working state. For example, the first physical port PHY needs to be added to the first FlexE group in the working state when load reaches a first threshold or a first preset moment is reached. Alternatively, when the first PHY is faulty, the side of the receiving device removes the first PHY from the FlexE group, and then when the first PHY is repaired, the side of the receiving device determines that the first PHY needs to be added to the first FlexE group in the working state. For other content of the operation, refer to the foregoing operation 401. Details are not described herein again.

Operation 602: The receiving device performs deskew on the first PHY or each PHY in the first FlexE group based on a received data stream corresponding to the first PHY and a received data stream corresponding to each PHY in the first FlexE group, and restores a data stream corresponding to a client from a PHY in the first FlexE group. In this way, the data stream corresponding to each client in the first FlexE group is not interrupted or lost, in other words, in operation 602, the first FlexE group is still in a normal working state.

Operation 603: If skew between the data stream corresponding to the first PHY and the data stream corresponding to each PHY in the first FlexE group after the deskew is performed is zero, the receiving device restores a data stream corresponding to a client from a PHY in a second FlexE group, where the second FlexE group is a FlexE group after the first PHY is added to the first FlexE group.

In an actual application scenario, for example, when a 100 GE data stream is transmitted through a PHY at a physical layer, the transmission is performed through a wire in appearance, but four or ten electromagnetic waves may be divided for transmission inside the wire. There is skew when different electromagnetic waves are transmitted along a same medium, and deskew needs to be performed on data channels in the PHY at a receive end, to implement alignment between the data channels in the PHY. In an embodiment of the application, skew may be described as skew in English, and deskew may be described as deskew in English. In a possible implementation, an alignment marker (which may be an alignment marker or an overhead block in the FlexE) is inserted into different PHYs at a transmit end, the alignment marker is locked at the receive end to align different channels, and data is restored.

The deskew in an embodiment of the application may also be described as the following: There is a derivation between time points at which two physical ports (it should be noted that the PHY and the physical port in an embodiment of the application may be replaced with each other) separately receive a same batch of feature blocks. A physical port that earlier receives the feature blocks may wait, by buffering a specific quantity of blocks, for another physical port that receives the feature block later. Data of different physical ports is aligned before being sent to a next module in parallel. A definition of the skew may also be described as a time difference between two PCS data channels in a process of aligning, according to an alignment flag, a PCS data channel that is transmitted faster and a PCS data channel that is transmitted slower. A definition of the skew may be described as "Skew is defined as the difference between the times of the earliest PCS lane and latest PCS lane for the one to zero transition of the alignment marker sync bits." in English. The alignment flag is described as "alignment marker" in English. In an embodiment of the application, the alignment flag may be an overhead block. The PCS in this segment of description does not specifically indicate a physical coding sublayer defined in the 802.3 standard. In an embodiment of the application, the PCS indicates a physical layer at which a FlexE interface is located. Deskew can be defined as a deskew function of the PCS used to compensate for skew between data channels on the side of a receiving device. A definition of the deskew may be described as "The PCS deskew function compensates for all lane-to-lane Skew observed at the receiver" in English.

Figure 7:
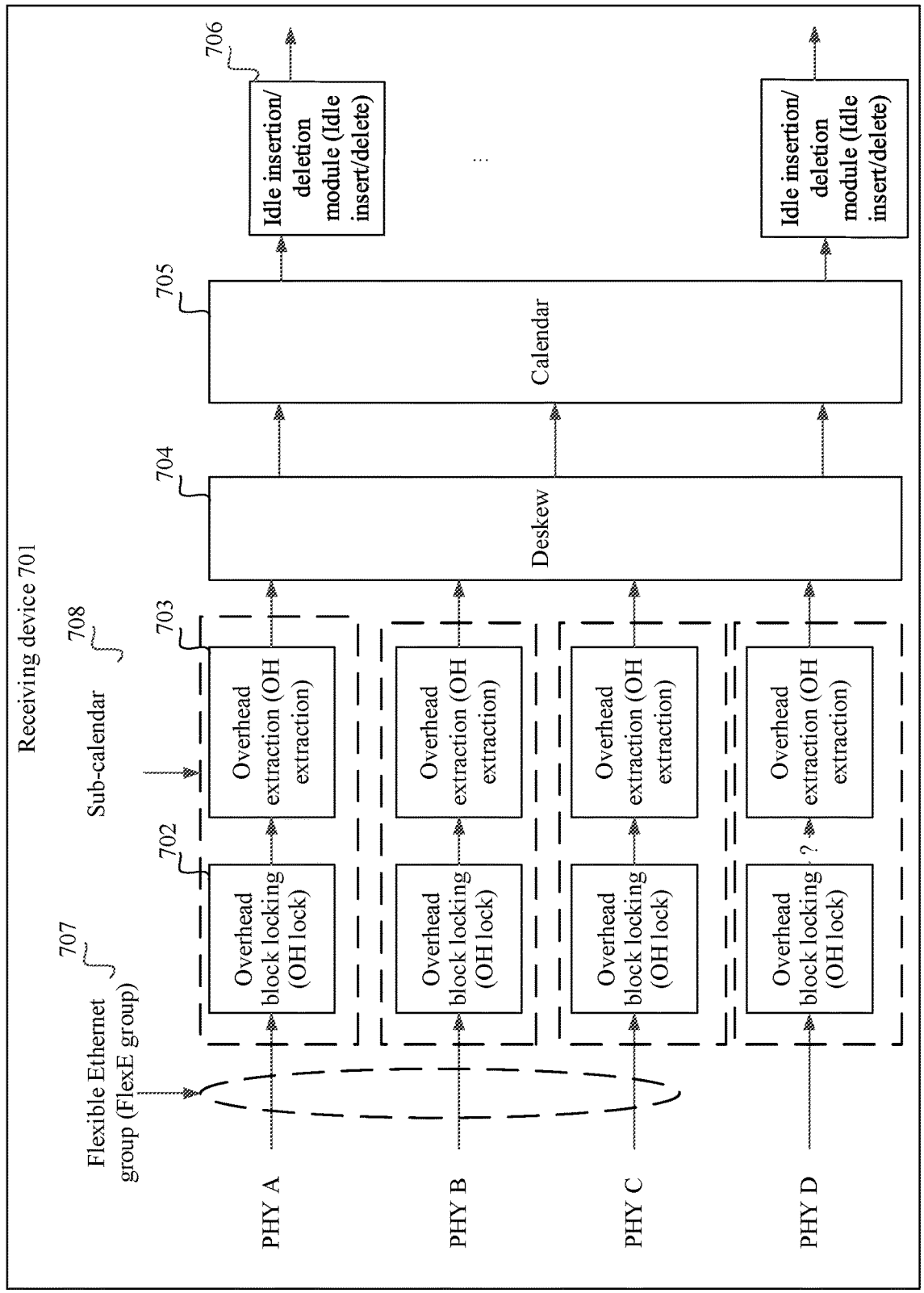
FIG. 7 is a schematic flowchart of a method for adjusting a PHY in a FlexE group performed by the side of a receiving device according to an embodiment of the application.

The following explains the foregoing content with reference to an actual example. FIG. 7 is a schematic flowchart of an example of a method for adjusting a PHY in a FlexE group performed by the side of a receiving device 701 according to an embodiment of the application. In FIG. 7, a first FlexE group is represented as a FlexE group 707, and the first FlexE group includes a PHY A, a PHY B, and a PHY C. The first PHY is represented as a PHY D in FIG. 7. As shown in FIG. 7, for a received data stream corresponding to each PHY in the first FlexE group, the receiving device 701 sequentially performs an operation of overhead block locking (OH Lock) and an operation of overhead block extraction (OH Extraction). For example, an operation of overhead block locking 702 and an operation of overhead block extraction 703 are performed on a data stream transmitted through the PHY A. There are not exactly the same path delays when each PHY in one FlexE group is used for transmission. For example, a path delay of the data stream transmitted through the PHY A is less than a path delay of a data stream transmitted through the PHY B. Therefore, an operation of deskew 704 needs to be performed. All PHYs are aligned through the deskew and then data streams of all the aligned PHYs is sent to a calendar 705 for processing. A series of processing may be performed by, for example, an idle block insertion/deletion (Idle insert/delete) module 706 on the processed data streams. The idle block insertion/deletion (Idle insert/delete) module 706 may also be configured to delete an ordered set block, to implement rate adaptation between a FlexE client and a FlexE group.

As shown in FIG. 7, if determining that the PHY D needs to be added to the first PHY D group, the receiving device also sequentially performs the operation of overhead block locking and the operation of overhead block extraction on a data stream corresponding to the received PHY D, and then performs deskew on the PHY A, the PHY B, the PHY C, and the PHY D in a deskew 704 module.

In an embodiment of the application, skew between PHYs when an overhead frame is inserted in a data stream corresponding to each PHY is referred to as skew before deskew is performed, and skew between PHYs after deskew is performed on each PHY is referred to as skew after deskew is performed.

In an embodiment of the application, the deskew may be implemented by increasing a data volume stored in a deskew buffer of a PHY or decreasing a data volume stored in a deskew buffer of a PHY. The deskew buffer may buffer a specific quantity of blocks used to compensate for skew between two physical ports. Adjusting the data volume stored in the deskew buffer of the PHY may also be described as adjusting a fill level of the PHY in a preset buffer, where the fill level may be written as fill level in English. The preset buffer is a buffer used when the deskew 704 performs the deskew in FIG. 7.

In operation 602, that the side of a receiving device performs deskew on the first PHY or each PHY in the first FlexE group may include: performing, by the receiving device, deskew on the first PHY by adjusting a fill level of the first PHY in a preset buffer; or performing, by the receiving device, deskew on each PHY in the first FlexE group by adjusting a fill level of each PHY in the first FlexE group in a preset buffer. There are a plurality of cases, which are described in detail below by using several examples. A third PHY mentioned in the following examples is any PHY in the first FlexE group. In the following content, a delay of a PHY before an overhead frame is locked is referred to as a delay amount before deskew is performed, a delay corresponding to the PHY after the overhead frame of the PHY is locked and after deskew is performed is referred to as a delay amount after deskew is performed, and the delay amount after deskew is performed on the PHY may be adjusted by adjusting the fill level of the PHY in the preset buffer.

For example, a delay amount of the first PHY before deskew is performed is less than a delay amount of the third PHY after deskew is performed, and a delay amount of the first PHY after deskew is performed is less than a delay amount of the third PHY after deskew is performed. Because the first FlexE group is already in a normal working state, all PHYs in the first FlexE group are aligned. In other words, skew of any two PHYs in the first FlexE group after deskew is performed is zero. It may also be described as that delay amounts of the any two PHYs in the first FlexE group after deskew is performed are the same. In this case, the fill level of the first PHY in the preset buffer may be adjusted to a high level, thereby increasing the delay amount after deskew is performed on the first PHY.

For another example, a delay amount of the first PHY before deskew is performed is equal to a delay amount of the third PHY after deskew is performed, and a delay amount of the first PHY after deskew is performed is equal to a delay amount of the third PHY after deskew is performed. In this case, the fill level of the first PHY in the preset buffer and a fill level of each PHY in the first FlexE group in the preset buffer may not be adjusted.

For another example, a delay amount of the first PHY before deskew is performed is greater than a delay amount of the third PHY after deskew is performed. In this case, a fill level of each PHY in the first FlexE group in the preset buffer may be adjusted to a high level.

In another optional implementation, after operation 601, and before the performing, by the receiving device in operation 602, deskew on the first PHY, the method further includes: determining, by the receiving device, that a capacity of the preset buffer is not less than a buffer capacity required for performing deskew on the first PHY. After operation 601, and before the performing, by the receiving device in operation 602, deskew on each PHY in the first FlexE group, the method further includes: determining, by the receiving device, that a capacity of the preset buffer is not less than a buffer capacity required for performing deskew on each PHY in the first FlexE group.

Correspondingly, after operation 601, the receiving device gives an alarm if determining that the capacity of the preset buffer is less than the buffer capacity required for performing deskew on the first PHY and each PHY in the first FlexE group. In other words, in an embodiment of the application, deskew is performed on each PHY in the first FlexE group and the first PHY. To implement alignment between the first PHY and each PHY in the first FlexE group, it needs to be ensured that the capacity of the preset buffer is not less than the buffer capacity required for performing deskew on the first PHY and each PHY in the first FlexE group. Otherwise, alignment between the first PHY and each PHY in the first FlexE group cannot be implemented, and manual intervention may be further needed in an alarming manner.

In an embodiment of the application, in a process of adjusting the fill level, the fill level of the first PHY or the fill level of each PHY in the first FlexE group may be adjusted at a constant rate, or may be adjusted by changing a rate. In a possible implementation, a delay amount of the first PHY before deskew is performed is greater than a delay amount of the third PHY after deskew is performed. In this case, the receiving device increases the fill level of each PHY in the first FlexE group in the preset buffer at one or more adjustment rates. This is equivalent to decreasing a rate on a write side of an idle insertion/deletion module corresponding to a client. Because a function of the idle insertion/deletion module is to adjust a rate difference between a FlexE interface side and a client side, when the rate on the write side of the idle insertion/deletion module is adjusted to be less than a read rate, a clock frequency deviation between the FlexE interface side and the client side may be adjusted by adding an idle block on the side of a receiving device. Because adding the idle block in a packet ruptures the packet (adding the idle block between different packets may not rupture the packet), an operation of increasing the fill level of each PHY in the first FlexE group in the preset buffer needs to be controlled, and a rate of adjusting the fill level cannot be too high. Therefore, when an operation of adding the idle block is performed on a complete packet, a case in which the idle block is passively inserted into a packet may not occur. If the packet is not ruptured, a data stream of the client may not be ruptured due to adding of the idle block, and a packet error or a packet loss may not occur due to adding of the idle block.

In an embodiment, maximum frequency differences of clock frequencies between FlexE interface sides and client sides that can be absorbed by an idle block insertion/deletion operation and/or an order set block deletion operation on different receiving device sides are different. This may also be described as that the idle block insertion/deletion operation and/or the order set block deletion operation on different receiving device sides has different capabilities of absorbing frequency differences. Therefore, the fill level of each PHY in the first FlexE group may be adjusted with reference to the capability of absorbing the frequency difference by performing the idle block insertion/deletion operation and/or the order set block deletion operation on the side of the receiving device. A process of adjusting the fill level needs to meet a requirement of the client of unawareness. In an optional implementation, one or more adjustment rates may be preset with reference to information such as the capability of absorbing the frequency difference by performing the idle block insertion/deletion operation and/or the order set block deletion operation on the side of the receiving device, and a type and a length of a transmitted packet, so that the preset adjustment rate is used to adjust the fill level during the deskew.

With reference to FIG. 7 for description, the deskew 704 performs deskew on a PHY in the first FlexE group and the first PHY. If a fill level of each PHY in the current first FlexE group needs to be increased, because the PHY in the first FlexE group is already in a normal working state, in other words, a data stream of a client is being transmitted, a rate for adjusting the fill level may be controlled. Therefore, an idle block insertion/deletion module corresponding to each PHY in the first FlexE group is used to perform rate adaptation, to enable the client to be unawareness of the adjustment of the fill level.

In an embodiment of the application, an operation occasion at which the side of the sending device adds the first PHY to the first FlexE group may be flexibly set, and may be before or after a time at which deskew is performed on the first PHY or each PHY in the second FlexE group other than the first PHY. In an embodiment, the foregoing operation 602 is: adding, by the receiving device, the first PHY to the first FlexE group; and performing, by the receiving device, deskew on the first PHY or each PHY in the second FlexE group other than the first PHY based on a data stream corresponding to each PHY in the second FlexE group, and restoring a data stream corresponding to a client from a PHY in the second FlexE group other than the first PHY.

In another optional implementation for implementing the foregoing operation 602 is: performing, by the receiving device, deskew on the first PHY or each PHY in the first FlexE group based on the received data stream corresponding to the first PHY and the received data stream corresponding to each PHY in the first FlexE group, and restoring the data stream corresponding to the client from the PHY in the first FlexE group; and after the skew between the data stream corresponding to the first PHY and the data stream corresponding to each PHY in the first FlexE group after the deskew is performed by the receiving device is zero, and before the restoring a data stream corresponding to a client from a PHY in the second FlexE group, the method further includes: adding, by the receiving device, the first PHY to the first FlexE group.

With reference to the foregoing two implementations of operation 602, in an optional implementation, regardless of whether the first PHY is added to the first FlexE group, before the skew between the data stream corresponding to the first PHY and the data stream corresponding to each PHY in the first FlexE group after the deskew is performed by the receiving device is zero, and after receiving, by the side of the receiving device, the data stream corresponding to the first PHY, the method further includes: generating a local fault block stream corresponding to the first PHY. With reference to FIG. 3, a local fault block generation 305 module may be used to generate the local fault block stream corresponding to the first PHY, and may be used to input the local fault block stream corresponding to the first PHY into the calendar 304.

After operation 601 and before operation 602, an optional implementation may be further included: sending, by the receiving device, first indication information to the sending device, where the first indication information is used to indicate that skew between the data stream corresponding to the first PHY and a data stream corresponding to any PHY in the first FlexE group is not adjusted to zero and/or that the first PHY is not added to the first FlexE group by the receiving device. Further, optionally, after the skew between the data stream corresponding to the first PHY and the data stream corresponding to each PHY in the first FlexE group after the deskew is performed by the receiving device is zero, and after the adding the first PHY to the first FlexE group, the method further includes: sending, by the receiving device, second indication information to the sending device, where the second indication information is used to indicate that skew between the data stream corresponding to the first PHY and a data stream corresponding to any PHY in the first FlexE group is adjusted to zero and that the first PHY is added to the first FlexE group by the receiving device. Optionally, the first indication information and the second indication information may be sent by using an OH in a FlexE channel from the side of a receiving device to the side of a sending device, or may be sent through a data channel in a FlexE channel from the side of a receiving device to the side of a sending device, or may be transferred by a network management system through a management plane, or the like.

Correspondingly, optionally, the sending device receives first indication information, where the first indication information is used to indicate that skew between a data stream corresponding to the first PHY and a data stream corresponding to any PHY in the first FlexE group is not adjusted to zero and/or that the first PHY is not added to the first FlexE group by a receiving device. The sending device receives second indication information, and when the second indication information is received, determines that the first PHY has a capability of sending a data stream corresponding to a client carried in the second FlexE group. Determining that the first PHY has the capability of sending the data stream corresponding to the client carried in the second FlexE group is that on the side of a sending device, the first PHY is already in a normal working state, and the network management system may allocate a client to the first PHY, to transmit data corresponding to the client, or the network management system may not allocate a client to the first PHY, to still send an error block stream through the first PHY.

Correspondingly, if the first PHY is not added to the first FlexE group when the second indication information is received on the side of the sending device, after receiving the second indication information, the sending device may further add the first PHY to the first FlexE group.

The following provides an example with reference to FIG. 7. As shown in FIG. 7, the first FlexE group includes a PHY A, a PHY B, and a PHY C, and each PHY occupies a 100 G of slots. It is assumed that the first FlexE group correspondingly carries services of a client 1 to a client n, the client 1 to the client n occupy a bandwidth of 250 G in total, and the PHY D is in a closed status. Currently, as user requirements increase, services of a client a and a client b need to be newly added, and each occupies a bandwidth of 75 G. After the PHY D is added to the first FlexE group through the foregoing operation, an unused 50 G slot in the PHY A, the PHY B, and the PHY C and an unused 100 G slot of the PHY D may be respectively allocated to the client a and the client b. In this way, it can be learned that in an embodiment of the application, a PHY may be dynamically added to the first FlexE group in the working state based on a service requirement, so that an establishment procedure of the FlexE group is more flexible.

The foregoing content describes the solution to flexibly adding the PHY to the FlexE group. The following describes a solution to flexibly deleting a PHY from a FlexE group. Optionally, in the solution, an example in which a second PHY needs to be deleted from a first FlexE group is used for description, adding and deleting the PHY in the FlexE group can be independently operated.

In an optional implementation, the method further includes: if the sending device determines that a second PHY needs to be deleted from the first FlexE group in the working state, and the second PHY is any PHY in the first FlexE group, sending, by the sending device through a PHY in the first FlexE group other than the second PHY, a data stream of a client corresponding to the first FlexE group, and stopping sending, through the second PHY, the data stream of the client corresponding to the first FlexE group; or if the sending device determines that a second PHY needs to be deleted from the first FlexE group in the working state, sending, by the sending device through a PHY in the first FlexE group other than the second PHY, a data stream of a client corresponding to the first FlexE group, stopping sending, through the second PHY, the data stream of the client corresponding to the first FlexE group, and deleting the second PHY from the first FlexE group. In an embodiment, the sending device may receive an instruction sent by another device, and the instruction is used to indicate that the second PHY needs to be deleted from the first FlexE group in the working state. Alternatively, the sending device determines, according to a preset rule, that the second PHY needs to be deleted from the first FlexE group in the working state. For example, the second PHY needs to be deleted from the first FlexE group in the working state when load decreases to a second threshold or reaches a second preset moment.

Correspondingly, in an optional implementation, the receiving device determines that a second PHY needs to be deleted from the first FlexE group in the working state, where the second PHY is any PHY in the first FlexE group, and the receiving device may perform any one of Manner a1, Manner a 2, and Manner a3 in the following content. In an embodiment, the receiving device may receive an instruction sent by another device, and the instruction is used to indicate that the second PHY needs to be deleted from the first FlexE group in the working state. Alternatively, the receiving device determines, according to a preset rule, that the second PHY needs to be deleted from the first FlexE group in the working state. For example, the second PHY needs to be deleted from the first FlexE group in the working state when load decreases to a second threshold or reaches a second preset moment.

Manner a1. The receiving device restores a data stream corresponding to a client from a data stream corresponding to a PHY in the first FlexE group other than the second PHY.

Manner a2. The second PHY is deleted from the first FlexE group after that the receiving device restores a data stream corresponding to a client from a data stream corresponding to a PHY in the first FlexE group other than the second PHY. In other words, an action of deleting the second PHY from the first FlexE group may be optional, and the second PHY may not be deleted in Manner a1, and the second PHY may be deleted in Manner a2.

Manner a3. The receiving device deletes the second PHY from the first FlexE group, and restores a data stream corresponding to a client from a data stream corresponding to a PHY in a third FlexE group, where the third FlexE group is a FlexE group after the second PHY is deleted from the first FlexE group.

In another optional implementation, the method further includes: if the sending device determines that a second PHY in the first FlexE group is faulty, sending, by the sending device through a PHY in the first FlexE group other than the second PHY, a data stream of a client corresponding to the first FlexE group, and stopping sending, through the second PHY, the data stream of the client corresponding to the first FlexE group; or if the sending device determines that a second PHY in the first FlexE group is faulty, sending, by the sending device through a PHY in the first FlexE group other than the second PHY, a data stream of a client corresponding to the first FlexE group, stopping sending, through the second PHY, the data stream of the client corresponding to the first FlexE group, and deleting the second PHY from the first FlexE group. There may be a plurality of scenarios in which the second PHY is faulty. For example, an underlying physical channel is directly disconnected, or the side of the receiving device cannot normally lock a FlexE frame or a FlexE multiframe due to a fault on the side of the sending device, a fault on the receiving side device, or the like; any one or more of PHY map, PHY number, and FlexE group number at a receive end and a transmit end (the receive end and the transmit end are two ends, namely, the side of the receiving device and the side of the sending device) are inconsistent; or skew between different PHYs exceeds an adjustment capability of a deskew buffer.

Correspondingly, in an optional implementation, the receiving device determines that the second PHY in the first FlexE group is faulty, and the receiving device may perform any one of Manner b1, Manner b2, and Manner b3 in the following content.

Manner b1. The receiving device restores the data stream corresponding to the client from the data stream corresponding to the PHY in the first FlexE group other than the second PHY, and generates a local fault block stream corresponding to the second PHY.

Manner b2. The second PHY is deleted from the first FlexE group after that the receiving device restores the data stream corresponding to the client from the data stream corresponding to the PHY in the first FlexE group other than the second PHY, and generates a local fault block stream corresponding to the second PHY. In other words, an action of deleting the second PHY from the first FlexE group may be optional, and the second PHY may not be deleted in Manner a1, and the second PHY may be deleted in Manner a2.

Manner b3. The receiving device deletes the second PHY from the first FlexE group, and restores the data stream corresponding to the client from the data stream corresponding to the PHY in the third FlexE group, where the third FlexE group is the FlexE group after the second PHY is deleted from the first FlexE group.

When the receiving device determines that the second PHY needs to be deleted from the first FlexE group in the working state or that the second PHY is faulty, the receiving device performs delay optimization on the PHY in the first FlexE group other than the second PHY. It can also be described as that the receiving device decreases the deskew on the PHY in the first FlexE group other than the second PHY.

For example, in an optional implementation, a delay amount of the second PHY before deskew is performed is greater than a delay amount of each PHY in the first FlexE group other than the second PHY before deskew is performed. In this case, the receiving device reduces deskew performed on each PHY in the first FlexE group other than the second PHY, to implement an optimization operation.

In the foregoing case, deskew performed on each PHY in the first FlexE group other than the second PHY may be reduced by decreasing a fill level of each PHY in the first FlexE group other than the second PHY. There is a deviation between clock frequencies on a FlexE interface side and on a client side. When a fill level is adjusted for each PHY in the first FlexE group, because a rate on a write side of a buffer corresponding to an idle block deletion operation correspondingly performed on the first FlexE group becomes higher, the clock frequency deviation between the FlexE interface side and the client side may be adjusted by using an idle block insertion/deletion module on the side of the receiving device. When an operation of decreasing the fill level of each PHY in the first FlexE group in a preset buffer is performed, a rate at which the fill level is decreased needs to be controlled, and the rate at which the fill level is adjusted cannot be too high. In this way, a block loss caused by overflowing in the buffer due to a high rate on the write side of the buffer corresponding to the idle block deletion operation can be avoided. Optionally, in an embodiment of the application, an order set block may also be deleted to implement rate adaptation. This is similar to the content of deleting the idle block. Details are not described herein again.

Figure 8:
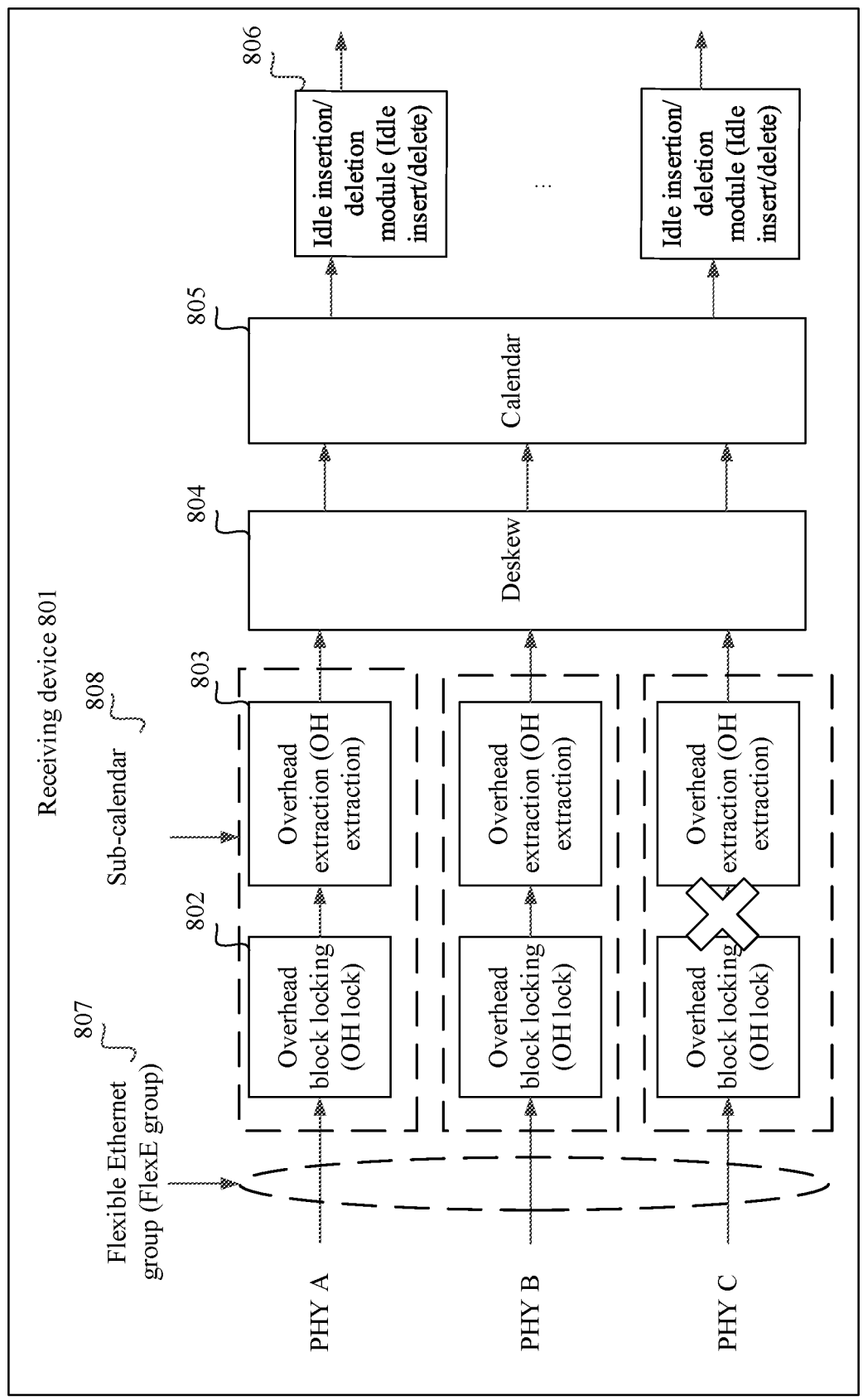
FIG. 8 is a schematic flowchart of a method for adjusting a PHY in a FlexE group performed by the side of a receiving device according to an embodiment of the application.

The following explains the foregoing content with reference to an actual example. FIG. 8 is a schematic flowchart of an example of a method for adjusting a PHY in a FlexE group performed by a side of the receiving device 801 according to an embodiment of the application. In FIG. 8, a first FlexE group is represented as a FlexE group 807, and the first FlexE group includes a PHY A, a PHY B, and a PHY C. The second PHY is represented as a PHY C in FIG. 8. As shown in FIG. 8, for a received data stream corresponding to each PHY in the first FlexE group, the receiving device 801 sequentially performs an operation of overhead block locking (OH Lock) and an operation of overhead block extraction (OH Extraction). For example, an operation of overhead block locking 802 and an operation of overhead block extraction 803 are performed on a data stream transmitted through the PHY A. There are not exactly the same path delays when each PHY in one FlexE group is used for transmission. For example, a path delay of the data stream transmitted through the PHY A is less than a path delay of a data stream transmitted through the PHY B. Therefore, an operation of deskew 804 needs to be performed. All PHYs are aligned through the deskew and then data streams of all the aligned PHYs is sent to a calendar 805 for processing. A series of processing may be performed by, for example, an idle block insertion/deletion (Idle insert/delete) module 806 on the processed data streams. The idle block insertion/deletion (Idle insert/delete) module 806 may also be configured to delete an ordered set block, to implement rate adaptation between a FlexE client and a FlexE group.

As shown in FIG. 8, after the receiving device determines that the PHY C needs to be deleted from the first FlexE group or that the PHY C is faulty, the PHY A and the PHY B can still continue to work, and may continue to restore data streams of clients from the PHY A and the PHY B. In this way, if one or more PHYs in one FlexE group are faulty, an entire FlexE group can still work.

Further, if a client 1 and a client 2 are transmitted through the PHY A, a client 3 and a client 4 are transmitted through the PHY B, and a client 5 is transmitted through the PHY C. After the PHY C is faulty, the client 5 may be switched to idle slots of the PHY A and the PHY B, or a data stream corresponding to the client 5 may be stopped transmitting, or a correspondence between the slots of the PHY A and the PHY B and the client 1, the client 2, the client 3, the client 4, and the client 5 is re-determined based on priorities of the client 1, the client 2, the client 3, the client 4, and the client 5. For example, if a priority of the client 5 is comparatively high and a priority of the client 4 is comparatively low, a data stream corresponding to the client 4 may be stopped transmitting, and slots of the PHY A and the PHY B are allocated to the client 5.

It can be learned from the foregoing content that in an embodiment of the application, the PHY may be flexibly added or deleted from the FlexE group in the working state, thereby improving robustness of a network connected through a FlexE port, and improving efficiency of a FlexE group port. In addition, problems of poor flexibility and low transmission efficiency of the FlexE group can be resolved. Further, compatibility with an existing standard may be achieved, or a FlexE client at an interface of a chip may be unawareness. Then, when a PHY in the FlexE Group is added or deleted, another PHY is not affected. Therefore, when the FlexE group carries a comparatively small quantity of services, some PHYs may be disabled to reduce energy consumption and reduce maintenance costs. When a PHY needs to be deleted from the FlexE group or it is determined that a PHY is faulty, fill levels of other PHYs in a normal working state in the FlexE group may be reduced as required, so that delays of the other PHYs in the normal working state are the lowest.

Figure 9:
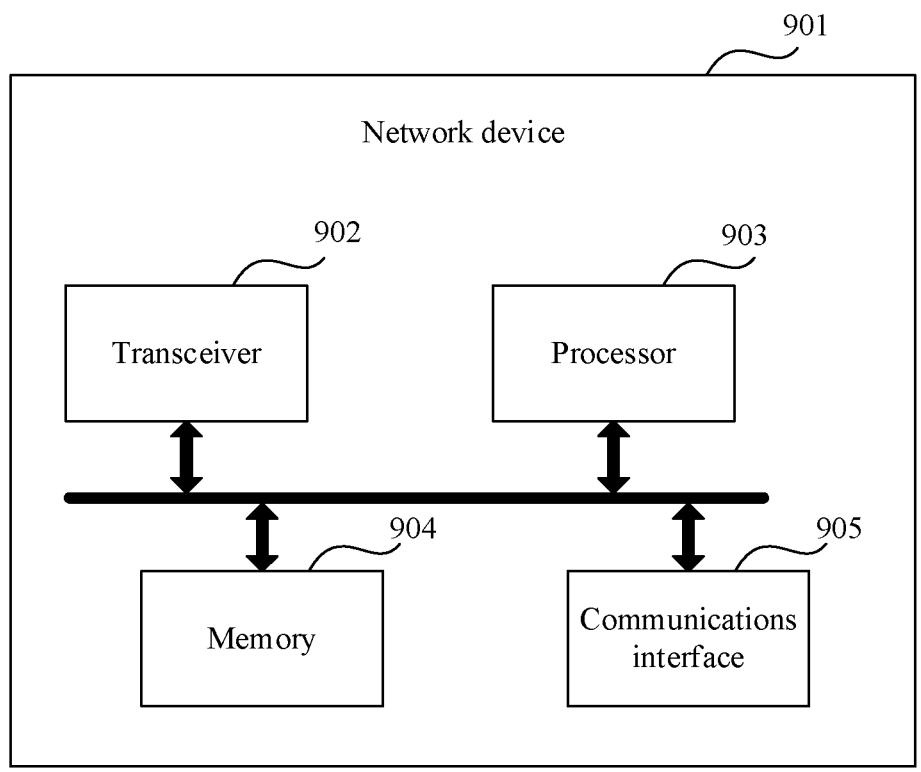
FIG. 9 is a schematic structural diagram of a network device according to an embodiment of the application.

Based on a same concept, FIG. 9 is a schematic structural diagram of an example of a network device according to an embodiment of the application. As shown in FIG. 9, a network device 901 includes a processor 903, a transceiver 902, a memory 904, and a communications interface 905. The processor 903, the transceiver 902, the memory 904, and the communications interface 905 are connected to each other by using a bus. The network device 901 in this example may be the sending device in the foregoing content, and may perform the solution corresponding to FIG. 4 or FIG. 5. The network device 901 may also be the receiving device in the foregoing content, and may perform the solution corresponding to FIG. 6.

The memory 904 may include a volatile memory, for example, a random access memory (RAM); or the memory may include a non-volatile memory, for example, a flash memory, a hard disk (e.g., hard disk drive, HDD), or a solid-state drive (SSD); or the memory 904 may include a combination of the foregoing types of memories.

The communications interface 905 may be a wired communications interface, a wireless communications interface, or a combination thereof. The wired communications interface may be, for example, an Ethernet interface. The Ethernet interface may be an optical interface, an electrical interface, or a combination thereof. The wireless communications interface may be a WLAN interface.

The processor 903 may be a central processing unit (CPU), a network processor (NP), or a combination of a CPU and an NP. The processor 903 may further include a hardware chip. The foregoing hardware chip may be an application-specific integrated circuit (ASIC), a programmable logic device (PLD), or a combination thereof. The PLD may be a complex programmable logic device (CPLD), a field-programmable gate array (FPGA), generic array logic (GAL), or any combination thereof.

Optionally, the memory 904 may further be configured to store a program instruction, and the processor 903 invokes the program instruction stored in the memory 904, to perform one or more operations or optional implementations in the embodiments in the foregoing solution, so that the network device 901 implements a function of the network device in the foregoing method.

In an embodiment, the network device 901 may be configured to perform the solution on the side of the sending device, such as the related solution in FIG. 4. In this case, the processor 903 is configured to: execute the instruction stored in the memory, and control the transceiver 902 to receive and send a signal. When executing the instruction stored in the memory, the processor 903 is configured to: determine that a first physical port PHY needs to be added to a first FlexE group in a working state and add the first PHY to the first FlexE group. The transceiver 902 is configured to: send a preset data stream through the first PHY in a second FlexE group, and send a data stream corresponding to a client through a PHY in the second FlexE group other than the first PHY, where the second FlexE group is a FlexE group after the first PHY is added to the first FlexE group.

In an embodiment, the transceiver 902 is further configured to: receive first indication information, where the first indication information is used to indicate that skew between a data stream corresponding to the first PHY and a data stream corresponding to any PHY in the first FlexE group is not adjusted to zero and/or that the first PHY is not added to the first FlexE group by a receiving device; and receive second indication information. The processor 903 is further configured to: when the second indication information is received, determine that the first PHY has a capability of sending a data stream corresponding to a client carried in the second FlexE group.

In an embodiment, the processor 903 is further configured to: if it is determined that a second PHY needs to be deleted from the first FlexE group in the working state or that a second PHY in the first FlexE group is faulty, and the second PHY is any PHY in the first FlexE group, send, through a PHY in the first FlexE group other than the second PHY, a data stream of a client corresponding to the first FlexE group, and stop sending, through the second PHY, the data stream of the client corresponding to the first FlexE group.

In an embodiment, the processor 903 is further configured to: if it is determined that a second PHY needs to be deleted from the first FlexE group in a working state or that a second PHY in the first FlexE group is faulty, and the second PHY is any PHY in the first FlexE group, send, through a PHY in the first FlexE group other than the second PHY, a data stream of a client corresponding to the first FlexE group, stop sending, through the second PHY, the data stream of the client corresponding to the first FlexE group, and delete the second PHY from the first FlexE group.

In an embodiment, the network device may be configured to perform the solution on the side of the sending device, such as the related solution in FIG. 5. In this case, a processor 903 is configured to: execute the instruction stored in the memory, and control the transceiver 902 to receive and send a signal. When executing the instruction stored in the memory, the processor 903 is configured to: determine that a first physical port PHY needs to be added to a first FlexE group in a working state. The transceiver 902 is configured to: send a preset data stream through the first PHY, and send a data stream corresponding to a client through a PHY in the first FlexE group. For any two data streams that are respectively of a data stream corresponding to each PHY in the first FlexE group and a data stream corresponding to the first PHY, locations of two associated overhead OH frames respectively inserted by a sending device in the two data streams are the same.

In an embodiment, the transceiver 902 is further configured to: receive first indication information, where the first indication information is used to indicate that skew between a data stream corresponding to the first PHY and a data stream corresponding to any PHY in the first FlexE group is not adjusted to zero and/or that the first PHY is not added to the first FlexE group by a receiving device; and receive second indication information. The processor 903 is further configured to: when the second indication information is received, determine that the first PHY has a capability of sending a data stream corresponding to a client carried in the second FlexE group, where the second indication information is used to indicate that skew between the data stream corresponding to the first PHY and a data stream corresponding to any PHY in the first FlexE group is adjusted to zero and that the first PHY is added to the first FlexE group by the receiving device.

In an embodiment, after that the processor 903 receives second indication information, the processor 903 is further configured to add the first PHY to the first FlexE group.

In an embodiment, the processor 903 is further configured to: if a second PHY needs to be deleted from the first FlexE group in the working state or that a second PHY in the first FlexE group is faulty, and the second PHY is any PHY in the first FlexE group, send, by the sending device through a PHY in the first FlexE group other than the second PHY, a data stream of a client corresponding to the first FlexE group, and stop sending, through the second PHY, the data stream of the client corresponding to the first FlexE group. In another optional implementation, the processor 903 is further configured to: if a second PHY needs to be deleted from the first FlexE group in the working state or that a second PHY in the first FlexE group is faulty, and the second PHY is any PHY in the first FlexE group, send, by the sending device through a PHY in the first FlexE group other than the second PHY, a data stream of a client corresponding to the first FlexE group, stop sending, through the second PHY, the data stream of the client corresponding to the first FlexE group, and delete the second PHY from the first FlexE group.

In an embodiment, the network device 901 may be configured to perform the solution on the side of the receiving device, such as the related solution in FIG. 6. In this case, the processor 903 is configured to: execute the instruction stored in the memory, and control the transceiver 902 to receive and send a signal. When executing the instruction stored in the memory, the processor 903 is configured to: determine that a first physical port PHY needs to be added to a first FlexE group in a working state; perform deskew on the first PHY or each PHY in the first FlexE group based on a data stream corresponding to the first PHY and a data stream corresponding to each PHY in the first FlexE group that are received by the transceiver 902, and restore a data stream corresponding to a client from a PHY in the first FlexE group; and if skew between the data stream corresponding to the first PHY and the data stream corresponding to each PHY in the first FlexE group after the deskew is performed is zero, restore a data stream corresponding to a client from a PHY in a second FlexE group, where the second FlexE group is a FlexE group after the first PHY is added to the first FlexE group. The transceiver 902 is configured to receive the data stream corresponding to the first PHY and the data stream corresponding to each PHY in the first FlexE group.

In an embodiment, for any two data streams that are respectively of the data stream corresponding to each PHY in the first FlexE group and the data stream corresponding to the first PHY, locations of two associated overhead OH blocks respectively inserted by a sending device in the two data streams are the same.

In an embodiment, the processor 903 is configured to: add the first PHY to the first FlexE group; and perform deskew on the first PHY or each PHY in the second FlexE group other than the first PHY based on a data stream corresponding to each PHY in the second FlexE group, and restore a data stream corresponding to a client from a PHY in the second FlexE group other than the first PHY.

In an embodiment, the processor 903 is configured to: perform deskew on the first PHY or each PHY in the first FlexE group based on the received data stream corresponding to the first PHY and the received data stream corresponding to each PHY in the first FlexE group, and restore the data stream corresponding to the client from the PHY in the first FlexE group; and the processor 903 is further configured to: after the skew between the data stream corresponding to the first PHY and the data stream corresponding to each PHY in the first FlexE group after the deskew is performed is zero, and before the data stream corresponding to the client is restored from the PHY in a second FlexE group, add the first PHY to the first FlexE group.

In an embodiment, the transceiver 902 is further configured to: send first indication information to the sending device, where the first indication information is used to indicate that skew between the data stream corresponding to the first PHY and a data stream corresponding to any PHY in the first FlexE group is not adjusted to zero and/or that the first PHY is not added to the first FlexE group by the receiving device; and send second indication information to the sending device, where the second indication information is used to indicate that skew between the data stream corresponding to the first PHY and a data stream corresponding to any PHY in the first FlexE group is adjusted to zero and that the first PHY is added to the first FlexE group.

In an embodiment, the processor 903 is configured to: perform deskew on the first PHY by adjusting a fill level of the first PHY in a preset buffer; or perform deskew on each PHY in the first FlexE group by adjusting a fill level of each PHY in the first FlexE group in a preset buffer.

In an embodiment, the processor 903 is further configured to determine that a capacity of the preset buffer is not less than a buffer capacity required for performing deskew on the first PHY; or the processor is further configured to determine that a capacity of the preset buffer is not less than a buffer capacity required for performing deskew on each PHY in the first FlexE group.

In an embodiment, the processor 903 is further configured to give an alarm if it is determined that the capacity of the preset buffer is less than the buffer capacity required for performing deskew on the first PHY and each PHY in the first FlexE group.

In an embodiment, the processor 903 is further configured to: determine that a second PHY needs to be deleted from the first FlexE group in the working state, where the second PHY is any PHY in the first FlexE group; and perform any one of the following content: restoring a data stream corresponding to a client from a data stream corresponding to a PHY in the first FlexE group other than the second PHY; deleting the second PHY from the first FlexE group after the data stream corresponding to the client is restored from the data stream corresponding to the PHY in the first FlexE group other than the second PHY; and deleting the second PHY from the first FlexE group, and restoring a data stream corresponding to a client from a data stream corresponding to a PHY in a third FlexE group, where the third FlexE group is a FlexE group after the second PHY is deleted from the first FlexE group.

In an embodiment, the processor 903 is further configured to: determine that the second PHY in the first FlexE group is faulty, where the second PHY is any PHY in the first FlexE group; and perform any one of the following content: restoring the data stream corresponding to the client from the data stream corresponding to the PHY in the first FlexE group other than the second PHY, and generating a local fault block stream corresponding to the second PHY; deleting the second PHY from the first FlexE group after the data stream corresponding to the client is restored from the data stream corresponding to the PHY in the first FlexE group other than the second PHY, and after the local fault block stream corresponding to the second PHY is generated; and deleting the second PHY from the first FlexE group, and restoring the data stream corresponding to the client from the data stream corresponding to the PHY in the third FlexE group, where the third FlexE group is the FlexE group after the second PHY is deleted from the first FlexE group.

In an embodiment, the processor 903 is further configured to: if it is determined that the second PHY needs to be deleted from the first FlexE group in the working state or that the second PHY is faulty, decrease the deskew on the PHY in the first FlexE group other than the second PHY.

Figure 10:
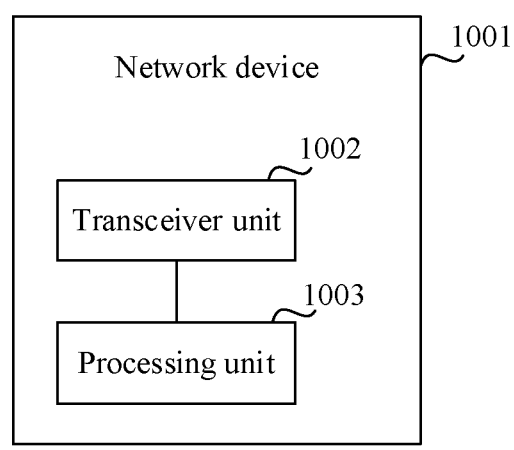
FIG. 10 is a schematic structural diagram of a network device according to an embodiment of the application.

Based on a same concept, FIG. 10 is a schematic structural diagram of an example of a network device according to an embodiment of the application. As shown in FIG. 10, a network device 1001 includes a transceiver unit 1002 and a processing unit 1003. The network device 1001 in this example may be the sending device in the foregoing content, and may perform the solution corresponding to FIG. 4 or FIG. 5. The network device 1001 may also be the receiving device in the foregoing content, and may perform the solution corresponding to FIG. 6.

In an optional implementation, the network device 1001 may be configured to perform the solution on the side of the sending device, such as the related solution in FIG. 4. In this case, the processing unit 1003 is configured to: determine that a first physical port PHY needs to be added to a first FlexE group in a working state, and add the first PHY to the first FlexE group. The transceiver unit 1002 is configured to: send a preset data stream through the first PHY in a second FlexE group, and send a data stream corresponding to a client through a PHY in the second FlexE group other than the first PHY, where the second FlexE group is a FlexE group after the first PHY is added to the first FlexE group.

In another optional implementation, the network device 1001 may be configured to perform the solution on the side of the sending device, such as the related solution in FIG. 5. In this case, the processing unit 1003 is configured to determine that a first physical port PHY needs to be added to a first FlexE group in a working state. The transceiver unit 1002 is configured to send a preset data stream through the first PHY, and send a data stream corresponding to a client through a PHY in the first FlexE group. For any two data streams that are respectively of a data stream corresponding to each PHY in the first FlexE group and a data stream corresponding to the first PHY, locations of two associated overhead OH frames respectively inserted by a sending device in the two data streams are the same.

In an optional implementation, the network device 1001 may be configured to perform the solution on the side of the receiving device, such as the related solution in FIG. 6. In this case, the processing unit 1003 is configured to: determine that a first physical port PHY needs to be added to a first FlexE group in a working state; perform deskew on the first PHY or each PHY in the first FlexE group based on a data stream corresponding to the first PHY and a data stream corresponding to each PHY in the first FlexE group that are received by the transceiver unit 1002, and restore a data stream corresponding to a client from a PHY in the first FlexE group; and if skew between the data stream corresponding to the first PHY and the data stream corresponding to each PHY in the first FlexE group after the deskew is performed is zero, restore a data stream corresponding to a client from a PHY in a second FlexE group, where the second FlexE group is a FlexE group after the first PHY is added to the first FlexE group. The transceiver unit 1002 is configured to receive the data stream corresponding to the first PHY and the data stream corresponding to each PHY in the first FlexE group.

It should be understood that division into the units of the network device is merely logical function division. In actual implementation, all or some of the units may be integrated into one physical device, or may be physically separate. In an embodiment of the application, the transceiver unit 1002 may be implemented by the transceiver 902 in FIG. 9, and the processing unit 1003 may be implemented by the processor 903 in FIG. 9. In an embodiment, the transceiver unit 1002 may perform the solution performed by the transceiver 902 in FIG. 9. The processing unit 1003 in an embodiment of the application may perform the solution performed by the processor 903 in FIG. 9. For other content, refer to the foregoing content. Details are not described herein again.

As shown in FIG. 9, the memory 904 included in the network device 901 may be configured to store code when the processor 903 included in the network device 901 performs a solution, where the code may be a program/code preinstalled before delivery of the network device 901.

In the foregoing embodiments, all or some of the functions may be implemented by using software, hardware, firmware, or any combination thereof. When being implemented by using software program, all or some of the functions may be implemented in a form of a computer program product. The computer program product includes one or more instructions. When the computer program instructions are loaded and executed on the computer, the procedure or functions according to the embodiments of the application are all or partially generated. The computer may be a general-purpose computer, a dedicated computer, a computer network, or other programmable apparatuses. The instructions may be stored in a computer storage medium or may be transmitted from a computer storage medium to another computer storage medium. For example, the instructions may be transmitted from a website, computer, server, or data center to another website, computer, server, or data center in a wired (for example, a coaxial cable, an optical fiber, or a digital subscriber line (DSL)) or wireless (for example, infrared, radio, and microwave, or the like) manner. The computer storage medium may be any usable medium accessible by a computer, or a data storage device, such as a server or a data center, integrating one or more usable media. The usable medium may be a magnetic medium (for example, a floppy disk, a hard disk, or a magnetic tape, a magneto-optical disk (MO)), an optical medium (for example, a CD, a DVD, a BD, an HVD), a semiconductor medium (for example, a ROM, an EPROM, an EEPROM, a non-volatile memory (NAND FLASH), a solid state drive (SSD)), or the like.

The embodiments of the application is described with reference to the flowcharts and/or block diagrams of the method, the device, system, and the computer program product according to the embodiments of the application. It should be understood that instructions may be used to implement each process and/or each block in the flowcharts and/or the block diagrams and a combination of a process and/or a block in the flowcharts and/or the block diagrams. These instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These instructions may be loaded onto a computer or another programmable data processing device, so that a series of operations and operations are performed on the computer or the another programmable device, thereby generating computer-implemented processing. Therefore, the instructions executed on the computer or the another programmable device provide operations for implementing a specific function in one or more processes in the flowcharts and/or in one or more blocks in the block diagrams.

Obviously, one of ordinary skill in the art can make various modifications and variations to embodiments of the application without departing from the spirit and scope of the application. The application is intended to cover these modifications and variations provided that they fall within the scope of protection defined by the following claims and their equivalent technologies.

What is claimed is:

1. A method for adjusting a physical port (PHY) in a flexible Ethernet (FlexE) group, comprising:
   determining, by a receiving device, that a first physical port (PHY) needs to be added to a first FlexE group including one or more PHYs in a working state;
   performing, by the receiving device, a deskew on the first PHY or each PHY in the first FlexE group based on a received data stream corresponding to the first PHY and the received data stream corresponding to each PHY in the first FlexE group, and restoring a data stream corresponding to a client from a PHY in the first FlexE group; and
   if a skew between the data stream corresponding to the first PHY and the data stream corresponding to each PHY in the first FlexE group after the deskew is performed is zero,
   restoring, by the receiving device, the data stream corresponding to the client from the PHY in a second FlexE group including the first PHY and the one or more PHYs in the first FlexE group after the first PHY is added to the first FlexE group.

2. The method according to claim 1, wherein for any two data streams that are respectively of the data stream corresponding to each PHY in the first FlexE group and the data stream corresponding to the first PHY, locations of two associated overhead blocks respectively inserted by a sending device in the any two data streams are the same.

3. The method according to claim 1, wherein the performing, by the receiving device, the deskew on the first PHY or each PHY in the first FlexE group based on the received data stream corresponding to the first PHY and the received data stream corresponding to each PHY in the first FlexE group, and restoring the data stream corresponding to the client from the PHY in the first FlexE group comprises:
   adding, by the receiving device, the first PHY to the first FlexE group; and
   performing, by the receiving device, the deskew on the first PHY or each PHY in the second FlexE group other than the first PHY based on the data stream corresponding to each PHY in the second FlexE group, and restoring the data stream corresponding to the client from the PHY in the second FlexE group other than the first PHY.

4. The method according to claim 3, wherein after the determining, by the receiving device, that the first PHY needs to be added to the first FlexE group in the working state, and before the skew between the data stream corresponding to the first PHY and the data stream corresponding to each PHY in the first FlexE group after the deskew is performed by the receiving device is zero, the method further comprises:
   sending, by the receiving device, a first indication information to a sending device, wherein the first indication information is used to indicate that at least one of the skew between the data stream corresponding to the first PHY and a data stream corresponding to any PHY in the first FlexE group is not adjusted to zero and the first PHY is not added to the first FlexE group by the receiving device; and
   after the skew between the data stream corresponding to the first PHY and the data stream corresponding to each PHY in the first FlexE group after the deskew is performed by the receiving device is zero, and after the adding the first PHY to the first FlexE group, the method further comprises:
   sending, by the receiving device, a second indication information to the sending device, wherein the second indication information is used to indicate that the skew between the data stream corresponding to the first PHY and a data stream corresponding to any PHY in the first FlexE group is adjusted to zero and that the first PHY is added to the first FlexE group by the receiving device.

5. The method according to claim 1, wherein the performing, by the receiving device, the deskew on the first PHY or each PHY in the first FlexE group based on the received data stream corresponding to the first PHY and the received data stream corresponding to each PHY in the first FlexE group, and restoring the data stream corresponding to the client from the PHY in the first FlexE group comprises:
   performing, by the receiving device, the deskew on the first PHY or each PHY in the first FlexE group based on the received data stream corresponding to the first PHY and the received data stream corresponding to each PHY in the first FlexE group, and restoring the data stream corresponding to the client from the PHY in the first FlexE group; and
   after the skew between the data stream corresponding to the first PHY and the data stream corresponding to each PHY in the first FlexE group after the deskew is performed by the receiving device is zero, and before the restoring the data stream corresponding to the client from the PHY in the second FlexE group, the method further comprises:
   adding, by the receiving device, the first PHY to the first FlexE group.

6. The method according to claim 1, wherein the performing, by the receiving device, the deskew on the first PHY or each PHY in the first FlexE group comprises:
   performing, by the receiving device, the deskew on the first PHY by adjusting a fill level of the first PHY in a preset buffer; or
   performing, by the receiving device, the deskew on each PHY in the first FlexE group by adjusting a fill level of each PHY in the first FlexE group in a preset buffer.

7. The method according to claim 1, further comprising:
after the determining, by the receiving device, that the first PHY needs to be added to the first FlexE group in the working state, and before the performing, by the receiving device, the deskew on the first PHY,
determining, by the receiving device, that a capacity of a preset buffer is not less than a buffer capacity required for performing the deskew on the first PHY;
or
after the determining, by the receiving device, that the first PHY needs to be added to the first FlexE group in the working state, and before the performing, by the receiving device, the deskew on each PHY in the first FlexE group,
determining, by the receiving device, that a capacity of the preset buffer is not less than a buffer capacity required for performing the deskew on each PHY in the first FlexE group.

8. The method according to claim 7, further comprising:
after the determining, by the receiving device, that the first PHY needs to be added to the first FlexE group in the working state,
giving, by the receiving device, an alarm if the capacity of the preset buffer is less than the buffer capacity required for performing the deskew on the first PHY and each PHY in the first FlexE group.

9. The method according to claim 1, further comprising:
determining, by the receiving device, that a second PHY needs to be deleted from the first FlexE group in the working state, wherein the second PHY is any PHY in the first FlexE group; and performing, by the receiving device, any one of the following:
restoring, by the receiving device, the data stream corresponding to the client from the data stream corresponding to the PHY in the first FlexE group other than the second PHY;
deleting the second PHY from the first FlexE group after the restoring, by the receiving device, the data stream corresponding to the client from the data stream corresponding to the PHY in the first FlexE group other than the second PHY; and
deleting, by the receiving device, the second PHY from the first FlexE group, and restoring the data stream corresponding to the client from the data stream corresponding to a PHY in a third FlexE group, wherein the third FlexE group is a FlexE group after the second PHY is deleted from the first FlexE group.

10. The method according to claim 1, further comprising:
determining, by the receiving device, that a second PHY in the first FlexE group is faulty, wherein the second PHY is any PHY in the first FlexE group; and performing, by the receiving device, any one of the following:
restoring, by the receiving device, the data stream corresponding to the client from the data stream corresponding to the PHY in the first FlexE group other than the second PHY, and generating a local fault block stream corresponding to the second PHY;
deleting the second PHY from the first FlexE group after the restoring, by the receiving device, the data stream corresponding to the client from the data stream corresponding to the PHY in the first FlexE group other than the second PHY, and after the generating the local fault block stream corresponding to the second PHY; and
deleting, by the receiving device, the second PHY from the first FlexE group, and restoring the data stream corresponding to the client from the data stream corresponding to the PHY in a third FlexE group, wherein the third FlexE group is a FlexE group after the second PHY is deleted from the first FlexE group.

11. The method according to claim 9, further comprising:
if the receiving device determines that the second PHY needs to be deleted from the first FlexE group in the working state or that the second PHY is faulty,
decreasing, by the receiving device, the deskew on the PHY in the first FlexE group other than the second PHY.

12. A method for adjusting a physical port (PHY) in a flexible Ethernet (FlexE) group, comprising:
receiving, by a sending device, a first indication information, wherein the first indication information is used to indicate that at least one of a skew between a data stream corresponding to a first physical port (PHY) and a data stream corresponding to any PHY in a first FlexE group is not adjusted to zero and the first PHY is not added to the first FlexE group by a receiving device;
determining, by the sending device, that a first PHY needs to be added to the first FlexE group including one or more PHYs in a working state;
adding, by the sending device, the first PHY to the first FlexE group; and
sending, by the sending device, a preset data stream through the first PHY in a second FlexE group, wherein the second FlexE group includes the first PHY and the one or more PHYs in the first FlexE group after the first PHY is added to the first FlexE group, and sending a data stream corresponding to a client through a PHY in the second FlexE group other than the first PHY.

13. The method according to claim 12, further comprising:
receiving, by the sending device, a second indication information, and when the second indication information is received, determining that the first PHY has a capability of sending a data stream corresponding to a client carried in the second FlexE group.

14. The method according to claim 12, further comprising:
if the sending device determines that a second PHY needs to be deleted from the first FlexE group in the working state or that the second PHY in the first FlexE group is faulty, and the second PHY is any PHY in the first FlexE group,
sending, by the sending device through a PHY in the first FlexE group other than the second PHY, a data stream of a client corresponding to the first FlexE group; or
sending, by the sending device through a PHY in the first FlexE group other than the second PHY, a data stream of a client corresponding to the first FlexE group.

15. A network device, comprising:
a transceiver;
a processor coupled to the transceiver, wherein the processor is configured to:
determine that a first physical port (PHY) needs to be added to a first FlexE group including one or more PHYs in a working state;
perform a deskew on the first PHY or each PHY in the first FlexE group based on a data stream corresponding to the first PHY and a data stream corresponding to each PHY in the first FlexE group that are received by a transceiver, and restore a data stream corresponding to a client from a PHY in the first FlexE group; and if a skew between the data stream corresponding to the first PHY and the data stream corresponding to each PHY in the first FlexE group after the deskew is performed is zero,
restore a data stream corresponding to a client from a PHY in a second FlexE group, wherein the second FlexE group includes the first PHY and the one or more PHYs in the first FlexE group after the first PHY is added to the first FlexE group; and
wherein the transceiver is configured to receive the data stream corresponding to the first PHY and the data stream corresponding to each PHY in the first FlexE group.

16. The network device according to claim 15, wherein for any two data streams that are respectively of the data stream corresponding to each PHY in the first FlexE group and the data stream corresponding to the first PHY, locations of two associated overhead blocks respectively inserted by a sending device in the any two data streams are the same.

17. The network device according to claim 15, wherein the processor is further configured to:
add the first PHY to the first FlexE group; and
perform the deskew on the first PHY or each PHY in the second FlexE group other than the first PHY based on a data stream corresponding to each PHY in the second FlexE group, and restore a data stream corresponding to a client from a PHY in the second FlexE group other than the first PHY.

18. The network device according to claim 17, wherein the transceiver is further configured to:
send a first indication information to a sending device, wherein the first indication information is used to indicate that at least one of the skew between the data stream corresponding to the first PHY and the data stream corresponding to any PHY in the first FlexE group is not adjusted to zero and the first PHY is not added to the first FlexE group; and
send a second indication information to the sending device, wherein the second indication information is used to indicate that the skew between the data stream corresponding to the first PHY and the data stream corresponding to any PHY in the first FlexE group is adjusted to zero and that the first PHY is added to the first FlexE group.

19. The network device according to claim 15, wherein the processor is further configured to:
perform the deskew on the first PHY or each PHY in the first FlexE group based on the received data stream corresponding to the first PHY and the received data stream corresponding to each PHY in the first FlexE group, and restore the data stream corresponding to the client from the PHY in the first FlexE group; and
wherein the processor is further configured to:
after the skew between the data stream corresponding to the first PHY and the data stream corresponding to each PHY in the first FlexE group after the deskew is performed is zero, and before the data stream corresponding to the client is restored from the PHY in the second FlexE group, add the first PHY to the first FlexE group.

20. The network device according to claim 15, wherein the processor is configured to:
perform the deskew on the first PHY by adjusting a fill level of the first PHY in a preset buffer; or
perform the deskew on each PHY in the first FlexE group by adjusting a fill level of each PHY in the first FlexE group in a preset buffer.

* * * * *